United States Patent [19]

Takada et al.

[11] Patent Number: 5,220,562
[45] Date of Patent: Jun. 15, 1993

[54] BRIDGE APPARATUS AND A COMMUNICATION SYSTEM BETWEEN NETWORKS USING THE BRIDGE APPARATUS

[75] Inventors: Osamu Takada, Sagamihara; Katsuyoshi Onishi; Koichi Kimura, both of Yokohama; Kazunori Nakamura, Hadano; Yoshihiro Takiyasu, Higashimurayama; Mitsuhiro Yamaga, Kawasaki; Kunio Hiyama, Fujisawa, all of Japan

[73] Assignee: Hitachi, Ltd., Tokyo, Japan

[21] Appl. No.: 520,712

[22] Filed: May 8, 1990

[30] Foreign Application Priority Data

May 12, 1989 [JP] Japan .................. 1-117303

[51] Int. Cl.⁵ .............................. H04J 3/02
[52] U.S. Cl. ................. 370/85.13; 370/85.9; 370/94.1
[58] Field of Search ........... 370/85.13, 85.14, 85.15, 370/94.1, 60; 340/825.05, 825.5, 825.52

[56] References Cited

U.S. PATENT DOCUMENTS

| | | | |
|---|---|---|---|
| 4,627,052 | 12/1986 | Hoare et al. | 370/85.13 |
| 4,707,827 | 11/1987 | Bione et al. | 370/85.13 |
| 4,897,841 | 1/1990 | Gang, Jr. | 370/85.13 |
| 4,933,937 | 6/1990 | Konishi | 370/85.13 |
| 5,060,228 | 10/1991 | Tsutsui et al. | 370/85.13 |

Primary Examiner—Curtis Kuntz
Assistant Examiner—T. Ghebretinsae
Attorney, Agent, or Firm—Fay, Sharpe, Beall, Fagan, Minnich & McKee

[57] ABSTRACT

Frontend LANs connecting plural stations are connected to plural nodes of a backbone LAN respectively. The backbone LAN is constituted by plural physical or logical links, and each node corresponds to each frontend LAN. A first data block is segmented into one or plural second data block units of fixed length and transferred to destination nodes, a bridge is provided in order to assemble the second data blocks into the first data block. The bridge can transmit the second data blocks to arbitrary links, and the receiving is performed through one link. The bridge a decoder also has a decoder for decoding whether the learning should be performed or not, based on the learning indication information existing in the second data block including the routing information.

26 Claims, 21 Drawing Sheets

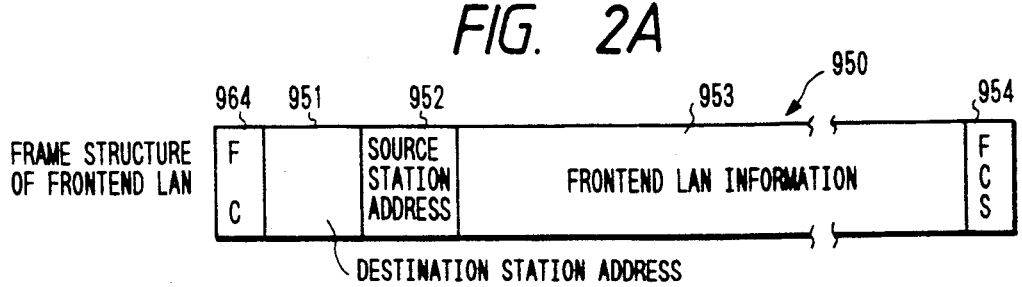
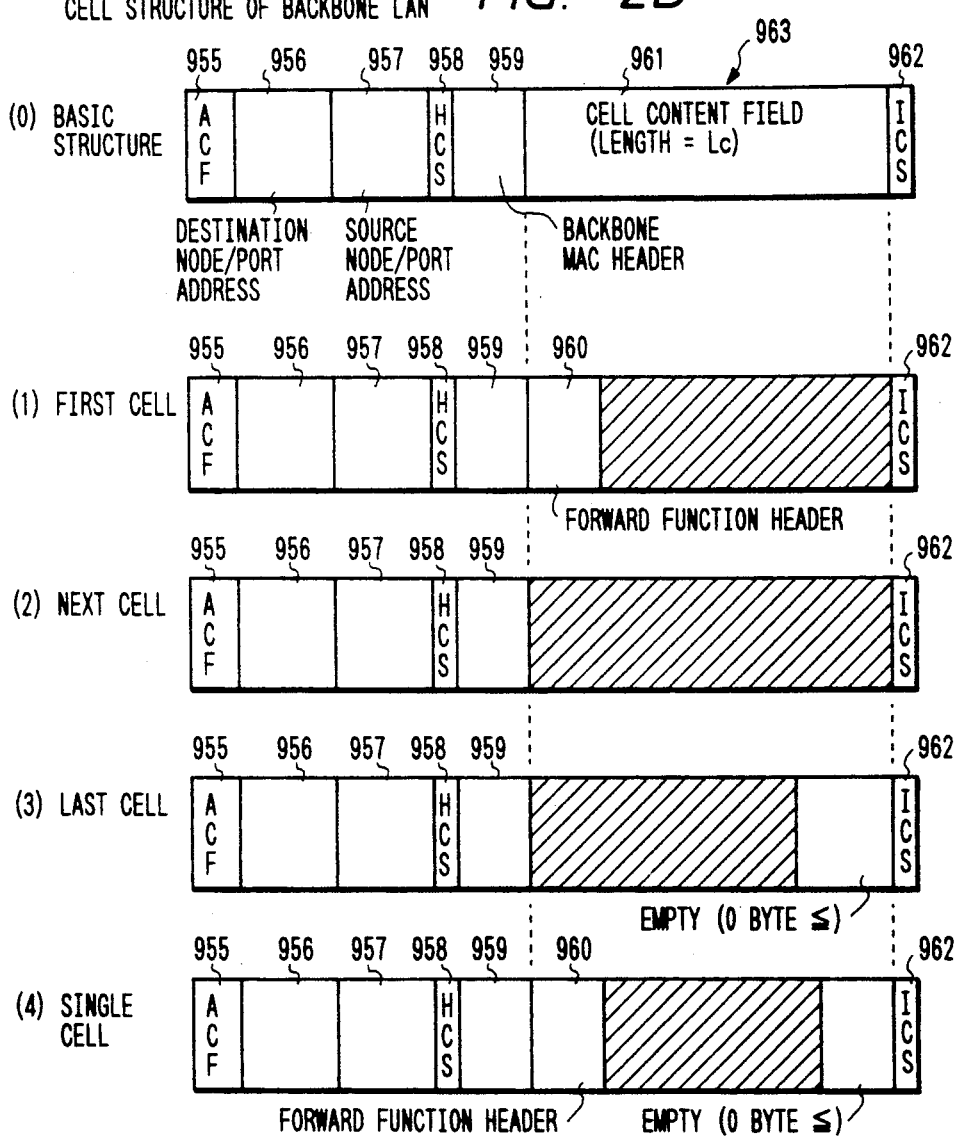

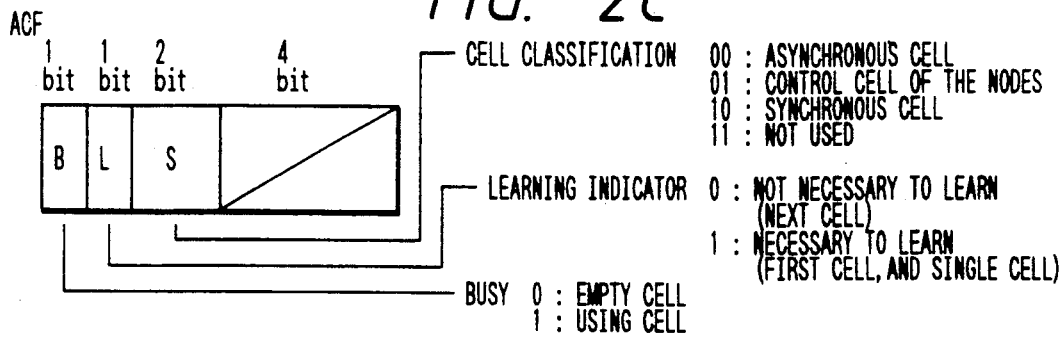
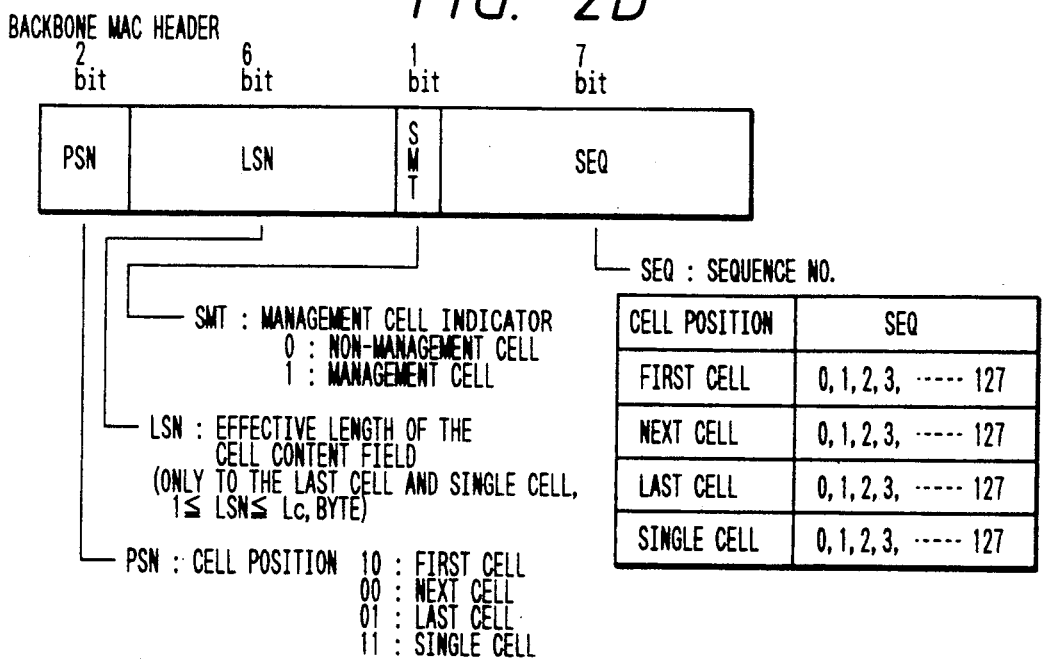
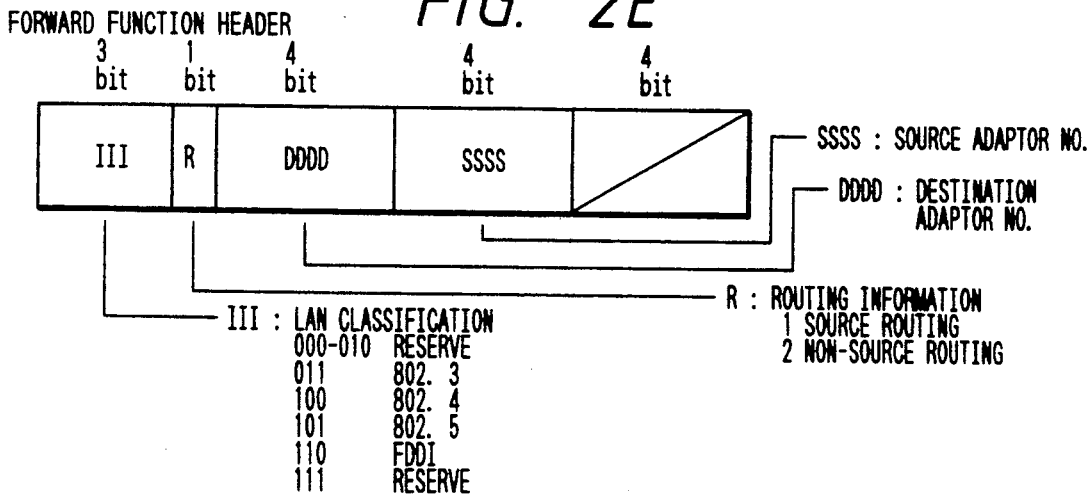

FIG. 2F  SEGMENT THE FRONTEND LAN FRAME/RE-ASSEMBLE THE BACKBONE LAN CELL
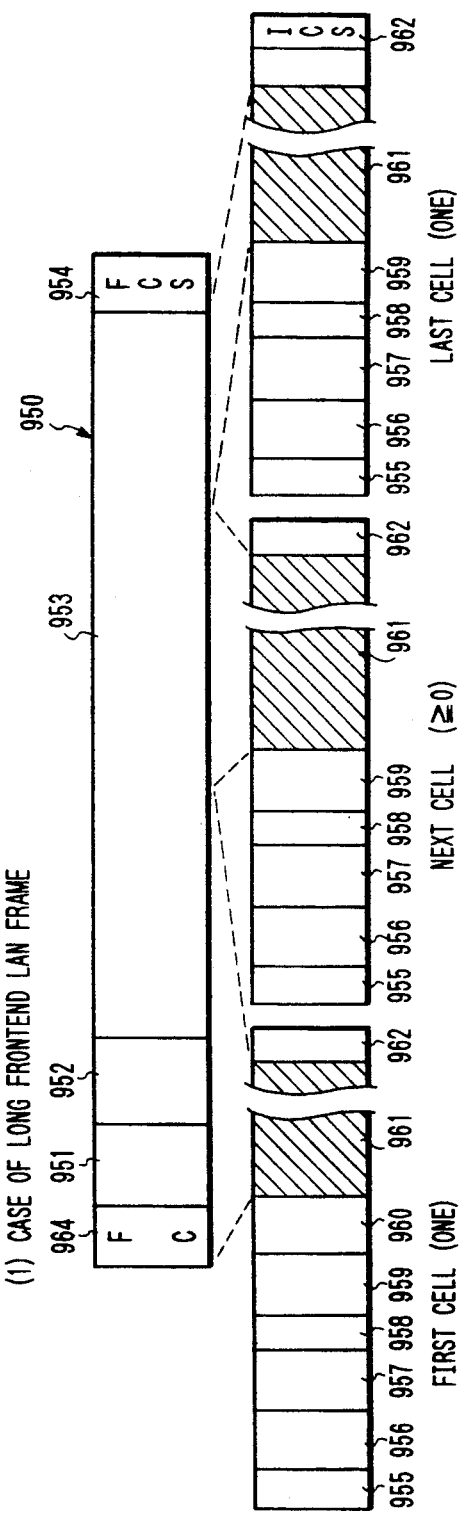
(1) CASE OF LONG FRONTEND LAN FRAME
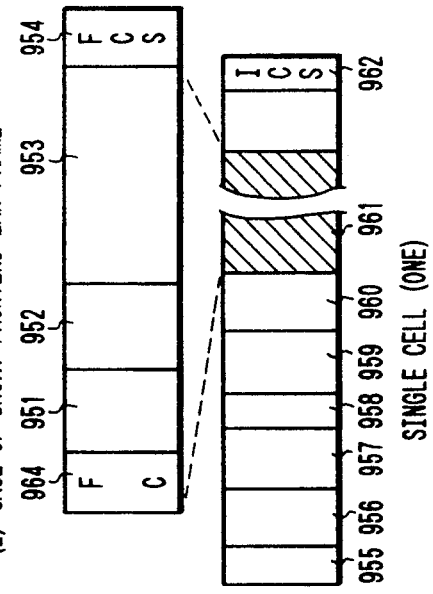
(2) CASE OF SHORT FRONTEND LAN FRAME

FIG. 3

|  | STATION ADDRESS | NODE ADDRESS | PORT ADDRESS |
|---|---|---|---|
| ENTRY 1 | p | D | i |
| ENTRY 2 | q | E | j |
| ENTRY 3 | NOT-USED | — | — |
|  |  |  |  |
|  |  |  |  |

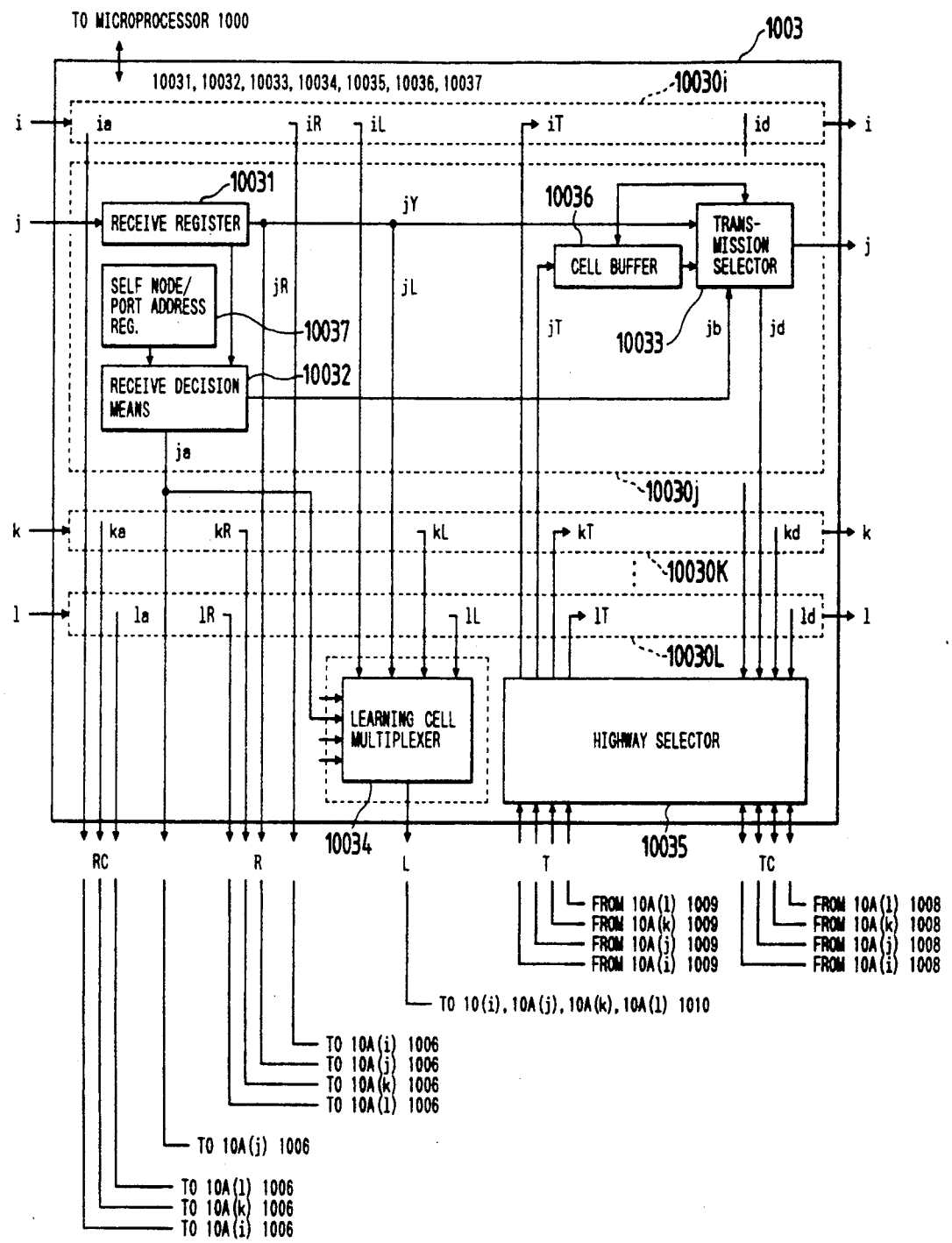

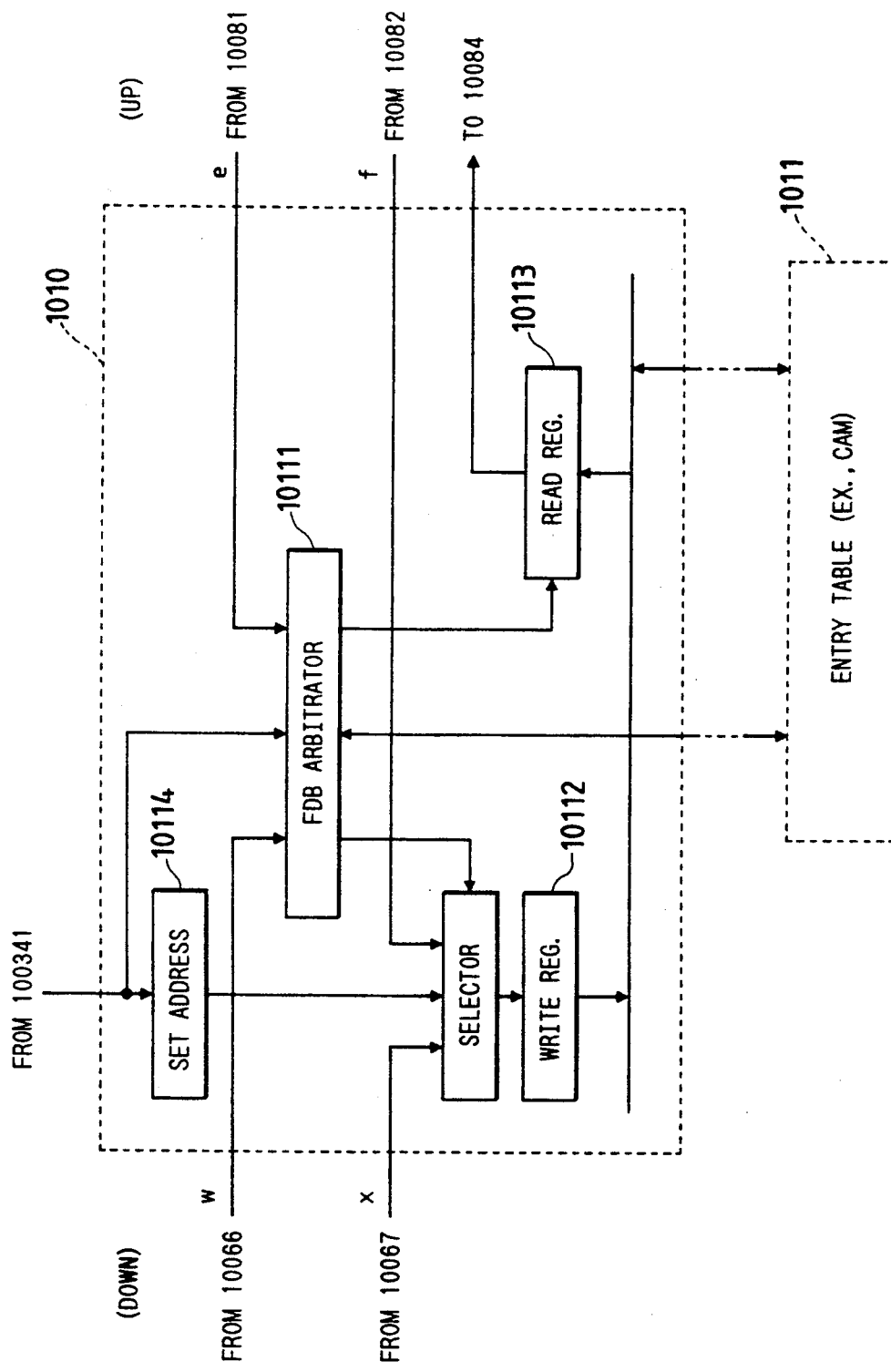

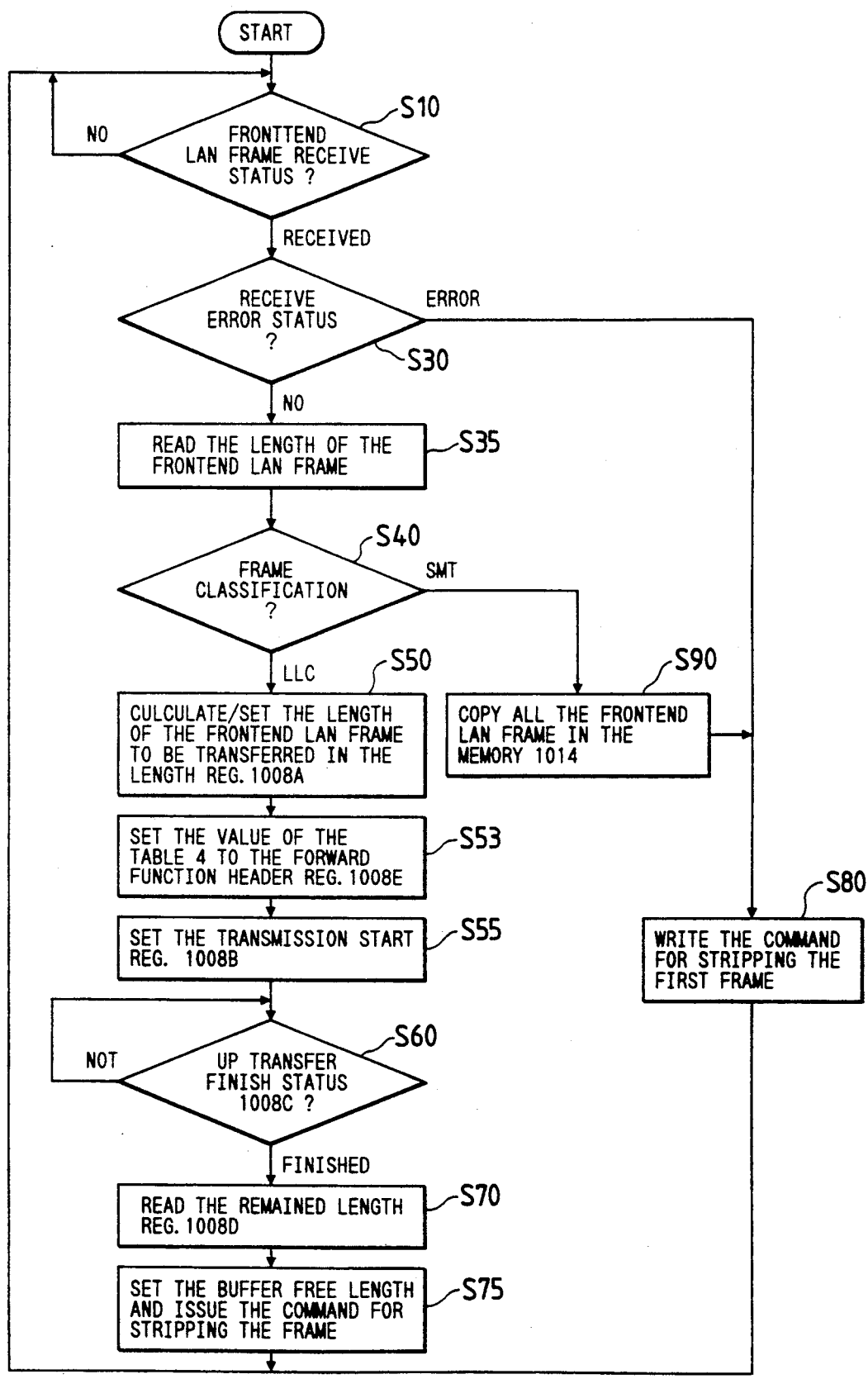

(NOTE): POINTER VALUE = 0 MEANS THE END OF CHAIN

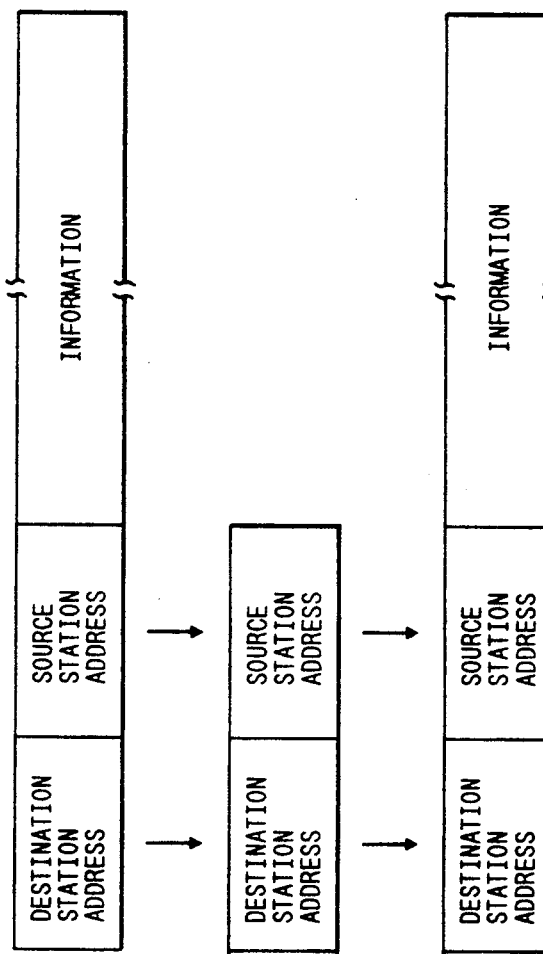
FIG. 13A FRONTEND LAN FRAME
FIG. 13B LEARNING FRAME
FIG. 13C BACKBONE LAN FRAME

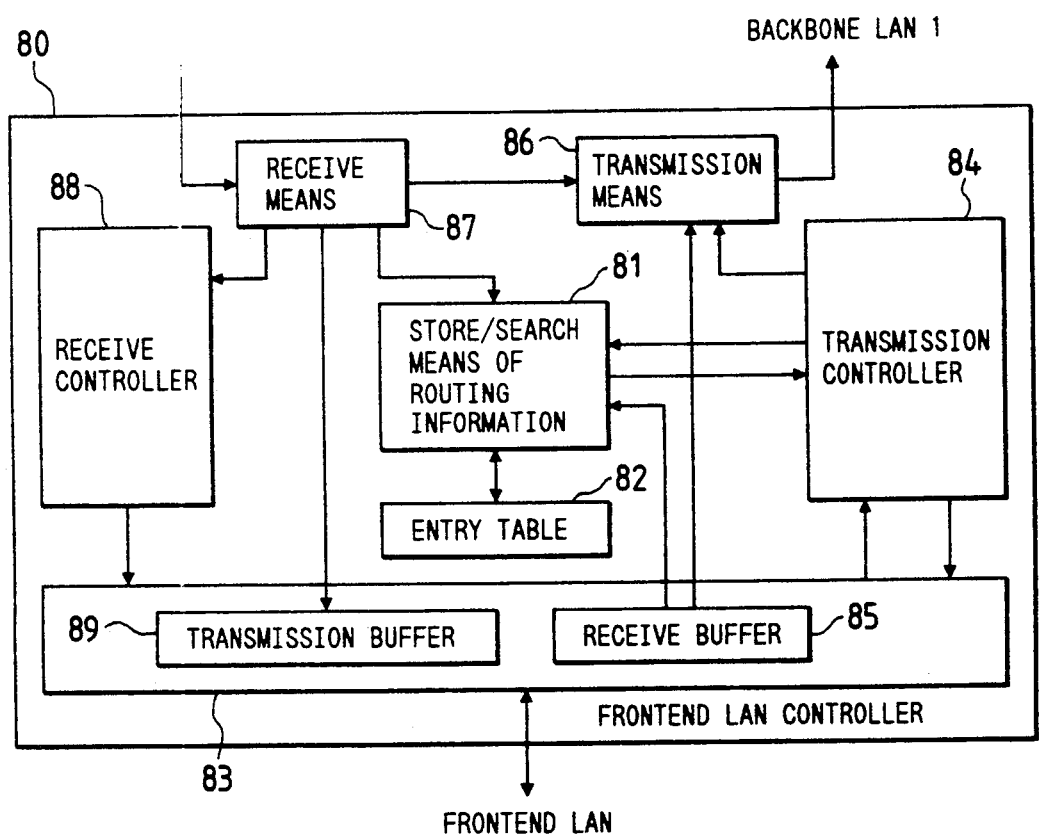

BRIDGE APPARATUS AND A COMMUNICATION SYSTEM BETWEEN NETWORKS USING THE BRIDGE APPARATUS

BACKGROUND OF THE INVENTION

The present invention relates to a bridge apparatus connecting between LANs (Local Area Networks) and a communication system between networks using the apparatus, and more specifically to a bridge apparatus connecting between a LAN transferring in fixed data unit and a control method thereof.

In a backbone LAN incorporating a frontend LAN, a routing system and a control method thereof in the prior art is disclosed in Japanese patent application laid-open No. 196132/1988 and performs as follows.

In communication between stations connected to frontend LANs, each station need not know the routing information regarding frontend LAN-ID to which a destination station is connected, nor its node address of a backbone LAN. A sending station address and a destination station address are added to the transmission data. If the destination address is in the same LAN as that of the sending station, the destination station can receive this data directly. Also if the destination station is connected through the backbone LAN to another frontend LAN, communication can be performed with transmittivity as if the transmitting and receiving stations were in the same LAN. This routing control is performed basically in accordance with the algorithm of learning bridge specified in the IEEE 802.1d MAC (Media Access Control) Bridges by nodes constituting LANs as follows.

A node holds an entry table where positions of stations are registered. When the node performs retrieval from the entry table regarding a destination station address of the frame supplied by a frontend LAN, and if the destination station is in the frontend LAN connected to the self node, the received frame is discarded. If the destination station is not in the frontend LAN connected to the self node or if it cannot be found, the received frame is transmitted by broadcast to the backbone LAN. Each backbone LAN node receives this frame and performs retrieval of the destination address from the entry table. If the destination station address is in the frontend LAN incorporated by the self node, the received frame is forwarded to the frontend LAN incorporated by the self node allowing the destination station to receives this frame. If the entry cannot be found, the frame is forwarded to the frontend LAN. If the destination station is in a frontend LAN incorporated by another node, the received frame is discarded.

As above described, the entry table, deciding whether a frame is forwarded using a station address as a key, has information indicating whether the station having the address is at the frontend LAN side or at the backbone LAN side. The entry table possessed by each node can learn whether a station is at the frontend LAN side or at the backbone LAN side from the sending (source) station address of frames flowing through the frontend LAN or frames flowing through the backbone LAN.

In the above-mentioned prior art, however, forward processing between frontend LANs through a backbone LAN constituted by a plurality of physical or logical links is not considered. Data transfer from the backbone LAN to the frontend LAN cannot be performed.

Also in the prior art, forwarding between a plurality of frontend LANs incorporated in a node is not considered and therefore data transfer cannot be performed to these frontend LANs.

In the prior art, since learning of the routing information in a backbone LAN in fixed length data unit is not considered, following point becomes a problem.

That is, data received from the frontend LAN by the node of the backbone LAN is divided in a plurality of fixed length data units. However, only one of the data units of the backbone LAN include the routing information, and other nodes of the backbone LAN does not recognize data to be learned.

Also in the prior art, since learning the routing information of a backbone LAN constituted by a plurality of physical or logical links is not considered, the following point becomes a problem.

When the node receiving the frame of the frontend LAN performs transmission by broadcast to the backbone LAN, the same data is transmitted along all links. On the other hand, as the learning manner in other node, the learning must be performed from all links. In this case, the learning by the same information occurs in the number of the links, and the futile learning process increases.

Also in the prior art, since learning of the routing information of a network constituted by a loop-shaped link is not considered, following point becomes a problem.

That is, the node forwarding data again receives the data after taking a round of the loop. Consequently, the learning is performed twice, i.e., when the data is received from the frontend LAN and when the data is received from the backbone LAN, and the futile learning process increases.

In addition, the prior art relating to a bridge circuit is disclosed, for example, in U.S. Pat. No. 4,597,078, "Bridge circuit for interconnecting networks".

SUMMARY OF THE INVENTION

An object of the invention is to provide a bridge apparatus for connecting a network performing communication in fixed length data unit to other network and a control method thereof.

Another object of the invention is to provide a bridge apparatus for connecting a network constituted by a plurality of links to other plural networks and a control method thereof.

A further object of the invention is to provide a bridge apparatus for connecting a network constituted by a loop-shaped link to other network and a control method thereof.

Still another object of the invention is to provide a bridge apparatus for connecting a plurality of frontend networks connecting stations to a backbone network and a communication system between networks using the bridge apparatus.

In order to attain the foregoing objects, in the invention, in constitution that frontend LANs connecting a plurality of stations are connected respectively to a plurality of nodes of a backbone LAN constituted by a plurality of physical or logical links. Each node corresponds to a frontend LAN. A first data (long data) block received from the frontend LAN is divided and converted into one or plural second data (short data) block units with fixed length and then transferred to a destination node. A bridge apparatus is provided where the transferred second data blocks are combined and converted into the first data block. The bridge apparatus can transmit the second data blocks to arbitrary links, and the second data blocks are received from one link. The bridge apparatus also has means for deciding whether the learning of routing information should be performed or not, based on the learning indication information existing in the second data blocks including the routing (station position) information.

That is, in the invention, a bridge apparatus is provided where a first data block received from a frontend LAN is divided and converted into one or more second data blocks having fixed length and error check code and then transferred to a destination node. The bridge apparatus has means for supplying the information indicating whether the learning is necessary or not (learning indication information) to the second data block including the routing information among the second data blocks, and means for learning the routing information based on the information indicating whether the learning is necessary or not when the second data blocks are received.

That is, the basic principle of the invention is in that the data transfer can be performed between a plurality of frontend LANs through a backbone LAN constituted by a plurality of loop shaped physical or logical links. The data is segmented to short data units with fixed lengths a.

In the invention, in a backbone LAN system comprising a plurality of loop-shaped physical or logical links and a node device connected thereto for transferring data to second data units with fixed length, each node has a plurality of ports corresponding to frontend LANs and each port has the bridge function to perform the data transfer between a plurality of physical or logical links of the backbone LAN and the frontend LANs.

The node at the transmission side supplies the learning indication to the short data including the routing information, and the node or port at the receiving side performs the learning of routing information from the learning indication of the short data.

On receiving the first data from the frontend LAN, the port registers set sending station address of data and the self node address go and the self port address to the entry of the entry table, and uses the destination address of the data as a key retrieve the entry. Thereby the destination node/port address can be obtained and the decision of discard/forwarding of the first data is performed. The decision results are of the following three sorts.

(1) The destination station is incorporated in the frontend LAN of the self node/port. Consequently, the data is discarded.

(2) The destination station is incorporated in the frontend LAN of another node. Consequently, the destination node/port address and the sending (self) node/port address are added to all short data, and further the short data including the sending station address is indicated by the learning indication and transmitted to the link to which the receiving means of the destination node/port of the backbone LAN is connected.

The port and the receiving link are preferably connected fixedly. That is, the receiving port address and the receiving link have the same number, thereby at the transmission side the data is transmitted to the link having the same number as that of the destination port address, and at the receiving side the receiving may be performed only from the link to which the self port is connected.

(3) The decision station cannot be found in the entry; therefore state of unknown destination occurs. Consequently, the destination node/port address set to the broadcast address and the sending (self) node/port address are added to all short data, and further the short data including the sending station address is indicated by the learning indication and transmitted to all links of the backbone LAN.

On the other hand, the receiving port receives the short data from the link assigned to the self port, and compares the destination node/port address with the self node/port address/ If both are coincident (including broadcast), the short data is taken and assembled to the data for the frontend LAN and then transferred to the frontend LAN of the self node. In this case, the entry need not be retrieved using the destination station address as a key.

The learning is performed when the learning indication is taken from the short data, thereby the sending station information (sending node/port, sending station address) is extracted and registered to the entry.

The port, after transmission of the short data with the learning indication, is not learned here, because the short data performing one round of the loop has been previously learned at the receiving state from the frontend LAN. That is, the learning is not performed from the short data where the destination node/port address and the self node/port address are coincident.

The invention may be learned as follows.

The node takes the short data with the learning indication bundled in all links, and transmits the sending station information to all ports in the self node. Each port registers the sending station information to the entry possessed by the port respectively.

At the transmission side (transmission port), the learning indication is added to the short data indicating the sending station position. The short data with the learning indication is then transmitted only to one link. Even in broadcast, only one arbitrary link is sufficient for the short data including the sending station address requiring the learning indication (for example, the link corresponding to the self port).

Also the invention may be learned as follows. Even in the case of discard, only the short data including the position information of the sending station may be transferred to the frontend LAN. Thereby, all ports can register the station position to the entry in similar manner to the case of forwarding. After this state, each port is enabled in the decision of forwarding/discard regarding this entry. Thereby transmission by broadcast due to the unknown destination is decreased.

BRIEF DESCRIPTION OF THE DRAWINGS

FIGS. 2A-2F are diagrams illustrating an embodiment in frame constitution of a frontend LAN and a cell constitution of a backbone LAN;

FIG. 3 is a diagram illustrating an embodiment of an entry table held by a node (port) connected to a backbone LAN;

FIGS. 4A-4C are a block diagram of an embodiment of a switch means 1003 in the node of FIG. 1, a block diagram of an embodiment of a learning cell multiplexer 10034, and a cell constitution diagram illustrating operation of the learning cell multiplexer 10034, respectively;

FIG. 7 is a block diagram of an embodiment of an FDB controller 1016 in the node of FIG. 1;

FIGS. 9A, 9B are flow charts of program executed by a microprocessor 1013 in FIG. 1;

FIGS. 13A–13C are diagrams illustrating frame constitution of a frontend LAN, frame constitution of a backbone LAN and constitution of a learning frame for the routing learning in another embodiment of the invention;

FIG. 14 is a diagram illustrating a specific example of a node connected to the backbone LAN of FIG. 12.

DESCRIPTION OF THE PREFERRED EMBODIMENTS

Embodiments of the invention will now be described referring to the accompanying drawings.

1. Constitution

1. 1 Whole Constitution

Figure 8A:
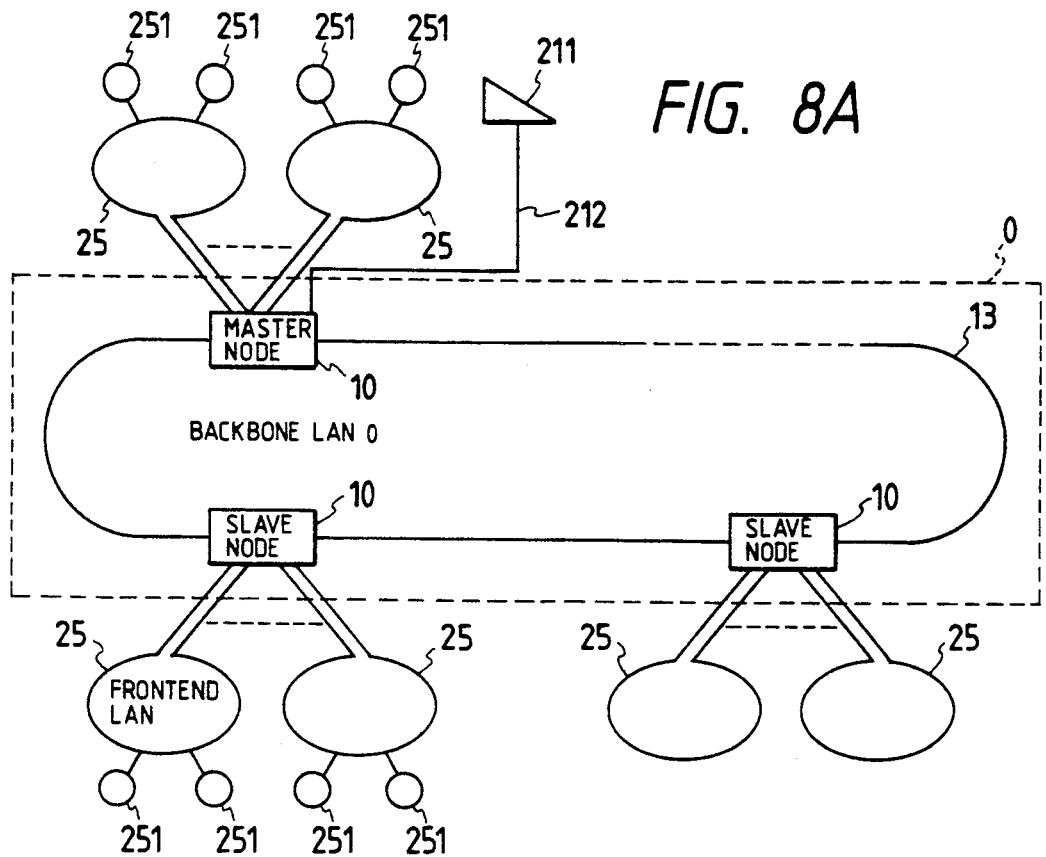
FIGS. 8A, 8B are diagrams illustrating system constitution in an embodiment and an application example of the invention.

FIG. 8A is a constitution diagram of the whole system representing an embodiment of the invention. A backbone LAN 0 comprises a loop-shaped physical link 13 and a plurality of nodes 10 connected thereto. Frontend LANs 25 at the outside of the backbone LAN 0 are connected through the nodes 10 to the backbone LAN 0. To each frontend LAN 25 are generally connected a plurality of stations (also called terminals) 251. In this case, the frontend LAN 25 is, for example, an FDDI (Fiber Distributed Data Interface), and the station 251 has MAC addresses of 48 bits. The frontend LAN 25 may be LANs in the MAC system being different from each other. A management device 211 may use a general work station having a file device. A node with the management device 211 connected thereto is called a master node, and a node other than this is called a slave node. The management device 211 is connected to the master node through a LAN, for example, a Ethernet 212. The management device 211 has the operation command function, that is, the function of changing the configuration of the backbone LAN in accordance with the command inputted by the operator and collecting the statistical information within the node. It also has the status monitor function, that is, the function of supervising the operation state of the backbone LAN and generating the alarm for the operator upon detecting trouble and also performing the logging for the file device.

1. 2 Node Constitution

Figure 1:
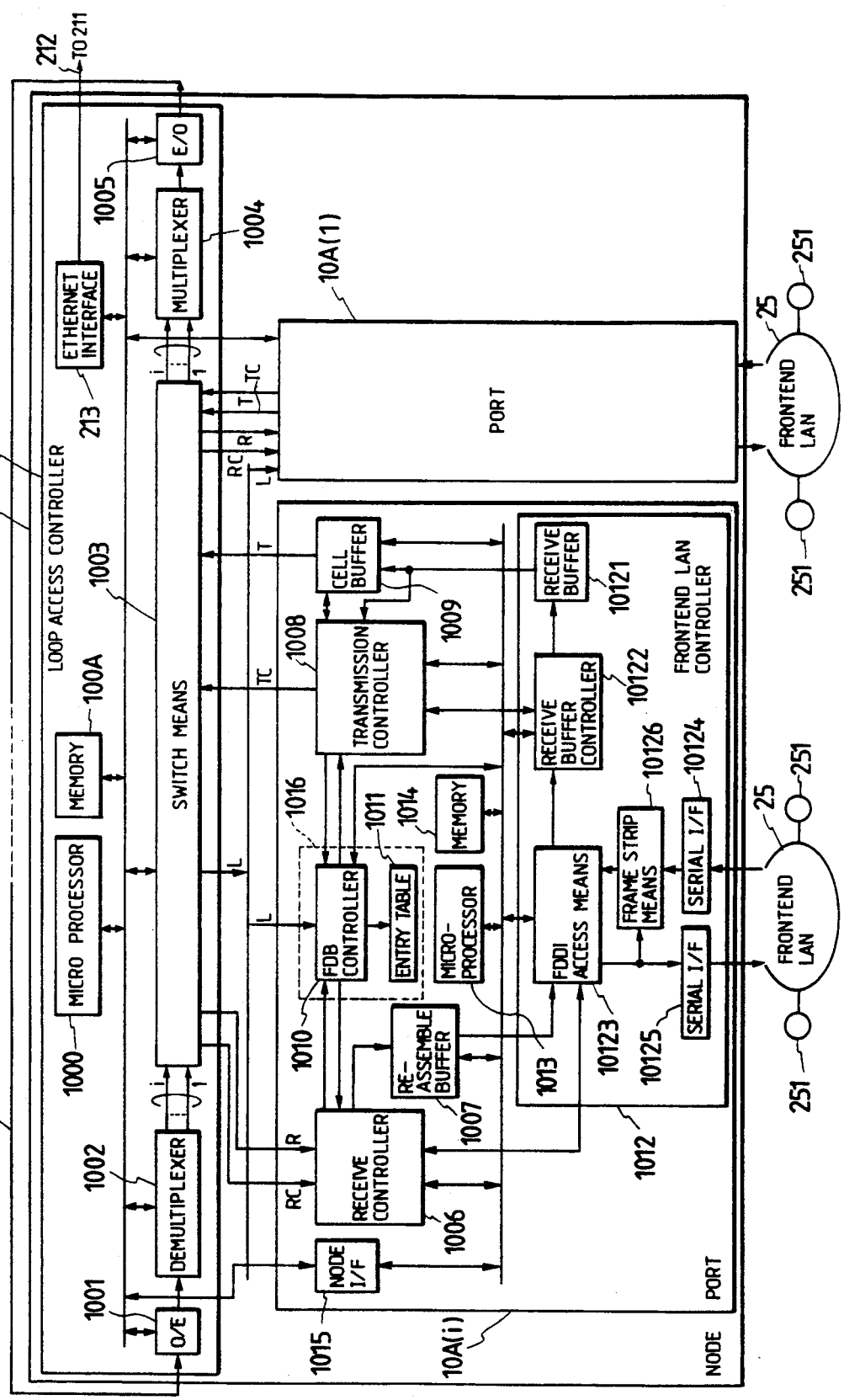
FIG. 1 is a block constitution diagram illustrating an embodiment of the invention.

FIG. 1 is a block diagram illustrating constitution of an embodiment of a node 10. In FIG. 1, an Ethernet interface 213 exists only at the master node. The node 10 comprises a loop access controller 100 and a plurality of ports 10A. The loop access controller 100 is connected to each port 10A through a set of lines M, RC, R, TC, and T. Furthermore, the loop access controller 100 is connected to all the ports 10A through the line L commonly. The relevant invention regarding the node constitution assigned to the same assignee as that of the present application is disclosed in Y. Takiyasu et al., "High-speed ring LAN system", U.S. Ser. No. 07/399,901, filed Aug. 29, 1989.

1. 2. 1 Loop Access Controller

The loop access controller 100 comprises an opto/electric converter 1001, a demultiplexer 1002 for demultiplexing the input data into, for example, logical highways i, j, k, l (hereinafter referred to simply as "highways") of 155 Mbps×N (N:4 for example), switch means 1003 for performing receive, transmit or forwarding of a fixed length bucket (called cell), a multiplexer 1004 for multiplexing N highways, and an electro/optic converter 1005. The demultiplexer 1002 and the multiplexer 1004 perform multiplexing/demultiplexing in N (for example, N=4) of SONET (Synchronous Optical Network) frames in so-called CCITT standard. In the demultiplexer 1002, an SOH (Selection Overhead) and a VC-4 (Vertical Container) are demultiplexed from the SONET frames, and the cell boundary signal and data of the cell are transmitted onto the highways. Further, numeral 1000 designates a microprocessor. Numeral 100A designates a memory such as RAM, ROM or the like. The microprocessor 1000 can access the memory 100A and other members (1001–1005) within the loop access controller 100 and also the Ethernet interface 213 if any. Further the control information is transmitted or received from the microprocessor 1000 through the switch means 1003, thereby communication is possible between the microprocessors 1000 with different nodes 10.

1. 2. 2 Port

The port 10A has the function of "Learning Bridge" specified in the IEEE 802.1d MAC Bridges.

The port 10A comprises a receive controller 1006 where cells received from the switch means 1003 are assembled into a frame of the frontend LANs, a reassemble buffer 1007, a transmit controller 1008, a cell buffer 1009 where frames of the frontend LANs are divided into cells and transmitted in cell unit to the switch means 1003, an FDB (Filtering Data Base) controller 1016, and a frontend LAN controller 1012. Further, numeral 1013 designates a microprocessor, and numeral 1014 designates a memory such as RAM, ROM or the like. Further, numeral 1015 designates a node I/F thereby the microprocessor 1013 of the port 10A and the microprocessor 1000 of the loop access controller 100 can communicate.

The frontend LAN controller 1012 further comprises an FDDI access means 10123, a receive buffer controller 10122, serial interfaces 10124 and 10125, and a receive buffer 10121. In this case, the FDDI access means 10123 can be realized, for example, by Am79C83 (FORMAC) of AMD (Advanced Micro Devices Inc.), and the receive buffer controller 10122 by Am79C82 (DPC)

and Am79C81 (RBC) of AMD, and the serial interfaces 10124 and 10125 by Am7984 (ENDEC) and Am7985 (EDS) of AMD and optical module DM74-742-XF of Sumitomo Electric Industries, Ltd., and the receive buffer by RAM. Also a frame strip means 10126 is a circuit for stripping a frontend LAN frame 950 (FIG. 2A) from the FDDI ring when the frontend LAN frame 950, forwarded (transmitted) from the backbone LAN side to the frontend LAN side by the port 10A, runs around the FDDI ring and returns to the port 10A. The frame strip means 10126 can be realized by a stripping circuit by forwarding frame counter control based on "Forwarding frame stripping system" described in ANSI materials PROPOSAL ON FRAME STRIPPING FOR BRIDGES IN FDDI (Henry Yang, K. K. Ramakrishnan and Bill Hawe, Jun. 16, 1989) for example, or by a CAM (Content Addressable Memory).

2. Explanation of Backbone LAN and Frontend LAN 2. 1 Outline of Structure of Cell and Frontend LAN Frame On each highway of the backbone LAN 0, a plurality of cells 963, as shown in FIG. 2B, take a round. The cell 963 comprises a header, a cell content field 961 and an ICS (Information Check Sequence) 962. The header further comprises an ACF (Access Control Field) 955, a destination node/port address 956, a source node/port address 957, an HCS (Header check Sequence) 958, and a backbone MAC header 959.

On the other hand, FIG. 2A shows frame structure of frontend LAN. A frontend LAN frame 950 comprises, for example, an FC (Frame Control) 964, a destination station address 951, a source station address 952, a frontend LAN information field 953 holding terminal information, and an FCS 954.

2. 2 Details of Frontend LAN Frame

Table 1 shows an example of frame structure of frontend LAN.

TABLE 1

Frame Structure of Frontend LAN

| Field | Length | Explanation |
|---|---|---|
| FC | 8 bits | frame sort (SMT, LLC etc.) |
| destination station address | 48 bits | in accordance with format of IEEE 802 MAC address |
| source station address | 48 bits | in accordance with format of IEEE 802 MAC address |
| frontend LAN information field | variable (0 to 4500 bytes) | information of transmit/receive between terminals |
| FCS | 32 bits | error check code covering from FC to frontend LAN information field |

2. 3 Details of backbone LAN cell

FIGS. 2C, 2D show details of the ACF 955 and the backbone MAC header 959 respectively. Also Table 2 shows an structure example of the destination node/port address 956, the source node/port address 957, the HCS 958, and the ICS 962.

TABLE 2

Cell Structure (partly)

| Field | Length | Explanation |
|---|---|---|
| destination node address | 10 bits | assign address of destination node and port |
| destination port address | 2 bits | Most significant bit (I/G bit) of destination node address indicates whether it is individual address (I/G = 0) or broadcast address (I/G = 1). Both together are called destination node/port address |
| source node address | 10 bits | assign address of source node and port |
| source port address | 2 bits | Both together are called source node/port address. |
| HCS | 8 bits | error check code covering destination node/port address and source node/port address |
| ICS | 16 bits | error check code covering backbone MAC header and cell content field |
| cell content field | 44 bytes | entering data to be transferred |

Although the node address and the port address are separated in the embodiment in Table 2, it is easily analogized that the node address and the port address as a whole can be treated as one node address. In this case, in FIG. 1, the port 10A within the node 10 becomes one in number.

2. 4 Segmenting/Re-assembling to/from cells

Transfer within the backbone LAN by the cell 963 is performed as shown in FIG. 2F, excluding the FCS 954 among the frontend LAN frame 950 (the legnth being made Lf bytes). Also in another embodiment, transfer including the FCS 954 is performed. At any rate, the transferring portion within the backbone LAN by the cell 963 is called transfer frontend LAN frame. The amount of Lf is different, but the following description can be similarly applied. Depending on the amount of Lf, in following conditions, segment to cell (generation of cell) is performed, and a part or the whole of the frontend LAN frame is copied to the cell content field. In this case, the length of the cell content field 961 is made to Lc bytes. It is usually made to several tens bytes.

(1) If Lf≦Lc, a single cell is generated.

(2) If Lc<Lf, cells are generated in the order of First cell at first, Next cell of 0 or more in number at next step, a and Last cell.

Regarding only the Single cell and the First cell, the forwarding function header 960 exists at the tip end portion of the cell content field 961. FIG. 2B (1)-(4) shows the form of the First/Next/Last/Single cells, and FIG. 2E shows form of the forward function header. As clearly understood from the above description, the destination station address and the source station address of the frontend LAN frame are stored in the cell content field of the First cell or the Single cell. The forward function header 960 will be described later.

3. Initialization by Software

The microprocessor 1000 of the loop access controller 100 starts the operation by reset of the power ON or the like, and by the program control on the memory 100A comprising ROM and RAM. The initialization is performed for the O/E means, 1001 the demultiplexer 1002, the switch means 1003, the multiplexer 1004, the E/O means 1005, the Ethernet interface means 213 and the like. Thereby, the node can communicate with other node through the physical link 13.

The port 10A performs the initialization by the microprocessor 1013, the memory 1014 for the frontend LAN controller 1012, the node i/f 1015, the receive controller 1006, the re-assemble buffer 1007, the FDB means 1016, the transmit controller 1008, the cell buffer 1007. Thereby, the data transfer can be performed between the frontend LAN 25 and the loop access controller 100.

With the initialization of the frontend LAN controller 1012, all frontend LAN frames 950 transmitted by the terminal 251 of the frontend LAN 25 can be received by receive buffer 10121. As a result, the preparation of the communication between the frontend LANs 25 through the backbone LAN network 0 is finished.

The program initialization data on the memories 100A and 1014 may be previously stored in the ROM, or the program initialization data from the management device 211 through the microprocessor 1000 of the master node may be subjected to the down line load to the memory 100A. Subsequently, the microprocessor 1000 of the master node may perform the down line load of the program/initialization data to the memory 100A of the slave node using the above-mentioned communication function between the microprocessors for each slave node. In each node 10, the program/initialization data may be loaded from the memory 1000 through the node i/f 1015 to the memory 1014 of each port 10A.

It is easily analogized that the up line load of the statistical information or the like to the management device 211 can be performed in the reverse direction, that is, from the memory 1014 through the node i/f 1015 to the memory 100A, and further using the above-mentioned communication between the microprocessors to the memory 100A of the master node, and further through the Ethernet interface 213.

4. Upward Forwarding from the Frontend LAN to the Backbone LAN

An embodiment of the node 10 will now be described. In this section, the embodiment is described where the frontend LANs 25 all have the same MAC system, for example, FDDI. Another embodiment where the LANs have different MAC systems from each other, shall be described later.

4. 1 Operation of Program

FIG. 9A is a flow chart of program executed by the microprocessor 1013. In following description, prefix S before each numeral refers to elements in the flow chart.

Figure 5:
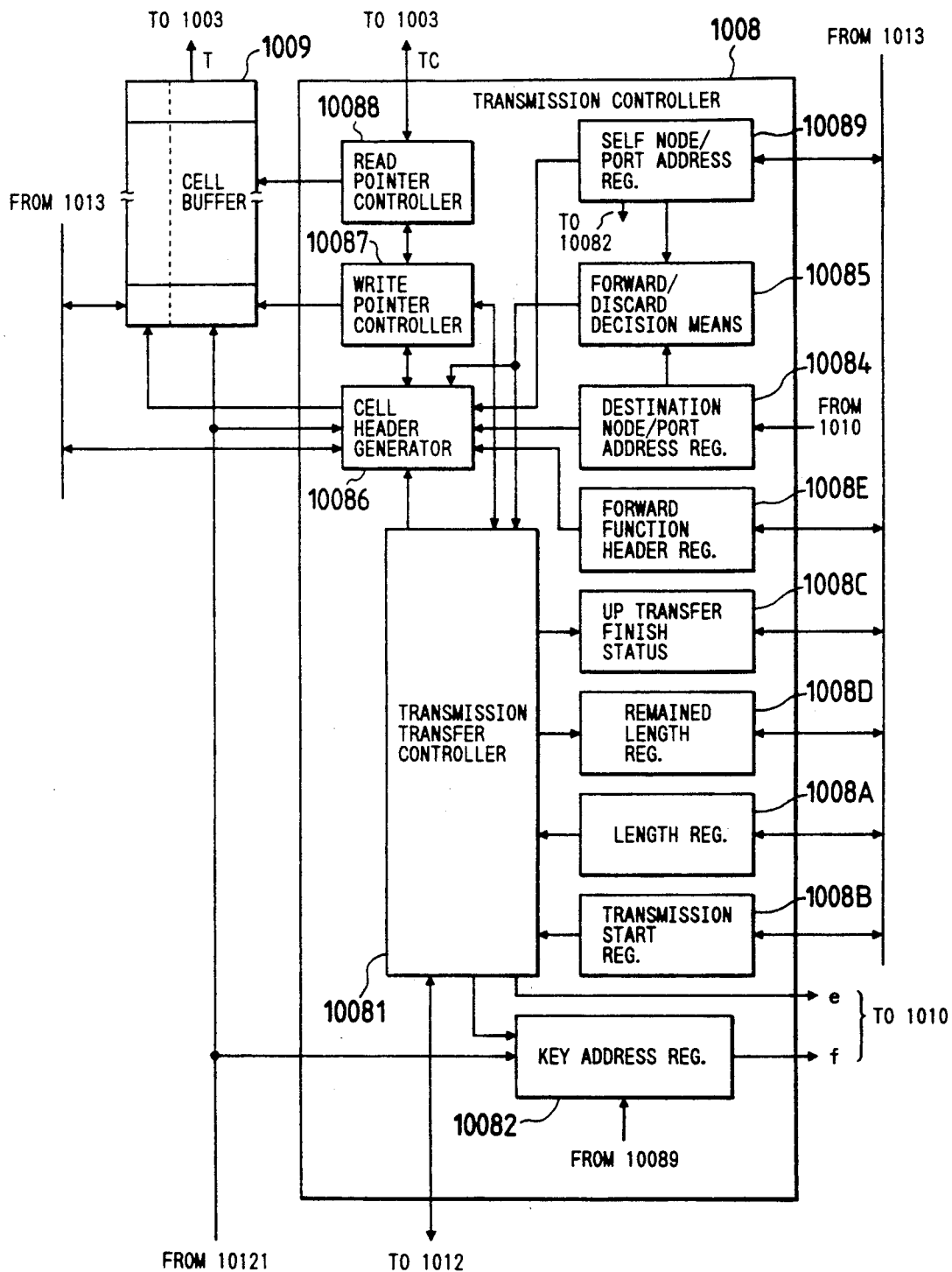
FIG. 5 is a block diagram of an embodiment of a transmission controller 1008 in the node of FIG. 1.

First, in order to supervise the receive of the frontend LAN frame 950 from the frontend LAN 25 to the receive buffer 10121, the microprocessor 1013 reads the receive buffer controller 10122 at S10, and decides the receive status of the frontend LAN frame. If no receive, S10 is repeated. If a receive exists, to check the receiving status of the frontend LAN frame, the receive error status is decided at S30. If any error exists, to remove the frontend LAN frame from the receive buffer 10121, the top frame remove command is written to the receive buffer controller 10122 at S80, and then the process goes to S10. If no error exists, the length of the frontend LAN frame is read from the receive buffer controller 10122 at S35. Then to check whether the frontend LAN frame is LLC frame or not, the FC 964 is checked and the frame classification is decided at S40. If it is a SMT frame, the whole frontend LAN frame is copied from the receive buffer 10121 to the memory 1014 at S90, and then process goes to S80. The SMT frame copied to the memory 1014 may be processed by other program at the microprocessor 1013. Otherwise it may be further transferred through the node i/f 1015 to the memory 100A, and may be processed by the microprocessor 1000. If it is a LLC frame, in order to transfer (upward transfer) the transfer frontend LAN frame from the receive buffer 10121 to the cell buffer 1009, the length of the transfer frontend LAN frame is calculated at S50 and set to the length REG 1008A (FIG. 5). Then the set value of Table 4 is set to the forward function header REG 1008E at S53, and the transmission start REG 1008B is set at S55. Then the FDB means 1016, the transmission controller 1008 and the cell buffer 1009 perform the filtering, the learning, the forwarding called in the learning bridge, which shall be described later. In the order to check whether the upward transfer is finished or not, the decision of the upward transfer finishing status REG 1008C is performed at S60. If not yet finished, S60 is repeated. If it is finished, since a part of the frontend LAN frame may remain in the receive buffer 10121, the remained length REG 1008D is read at S70, and the buffer freed length is calculated using the frontend LAN frame length read at S35. The buffer freed length is set to the receive buffer controller 10122 at S75 and the buffer freed command is written so that the receive decision of next frontend LAN frame can be performed at S10.

4. 2 Hardware Operation in Upward Direction

Next, referring to FIGS. 4 and 5, operation of the transmission controller 1008, the cell buffer 1009, the FDB means 1016 and the switch means 1003 will be described.

In FIG. 5, the transmission transfer controller 10081 performs the DMA transfer control with the receive buffer controller 10122 in response to signal from the transmission start REG 1008B. At the same time, the transfer command is issued to the write pointer controller 10087, which outputs the write address and control signal to the cell buffer 1009, thereby the frontend LAN frame 950 is divided, for example, in four byte unit, and transferred repeatedly from the receive buffer 10121 to the cell buffer 1009. Then in the receive buffer 10121, the buffer area corresponding to the transfer is freed by the receive buffer controller 10122.

Further the transmission transfer controller 10081 makes the key address REG 10082 take the destination station address 951 in the timing of the destination station address 951 transferred to the cell buffer 1009. The filtering request to the FDB means 1016 is then issued on "e" line. Also the source station address 952 is taken by the key address REG 10082 at different timing. The value of the self node/port address REG 10089 is also taken. The three sets of address information (terminal or station address, node address, port address) are finished, and then the learning request is issued to the FDB means 1016. The cell buffer 1009 is provided to absorb the speed difference between the communication speed of the frontend LAN 25 (for example, FDDI=100

Mbps) and the communication speed of the backbone LAN 0 (155 Mbps) and to enable concurrent processing of the data transfer processing from the frontend LAN controller 1012, the filtering and learning processing to the FDB means 1016 and the cell transfer processing to the switch means 1003. That is, the step (piece) number of the cell buffer 1009 may be three or more.

For example, when four steps (pieces) of the cell buffer 1009 are provided, the following state may be assumed. An example of the content of the first step at the front column follows. The cell is being transferred to the switch 1003, and since the cell of the second step is finished in the filtering (finish of the header generating) and the result is the forward, the transfer to the switch means 1003 is suspended. Further, if the content of the third step is being filtered (including the header being generated), in the content of the fourth step, the next data may be learned during the transfer and the filtering may be prepared.

As described above, since concurrent processing can be performed, even if the transfer of the cell at the first step to the switch 1003 is delayed for a long time, as long as the empty exists at the succeeding step, this area may be utilized. Thereby the filtering of the succeeding frontend LAN frame can be performed continuously and the filtering performance is improved. That is, as long as the discard continues, the overlaying to the position is performed and therefore the empty is not lost.

The control of the cell buffer 1009 is performed by the read pointer controller 10088 and the write pointer controller 10087 in the FIFO method.

4. 3 FDB Means

FIG. 7 is a diagram illustrating an FDB means. The FDB means 1016 comprises an entry table 1011 and an FDB controller 1010. The entry table 1011 can be realized by using a CAM, for example, Am95C85 manufactured by AMD Inc. FIG. 3 shows a table composed of three sets of address (station address, node address, port address), which represents the content of the entry table 1011 logically.

Figure 4B:
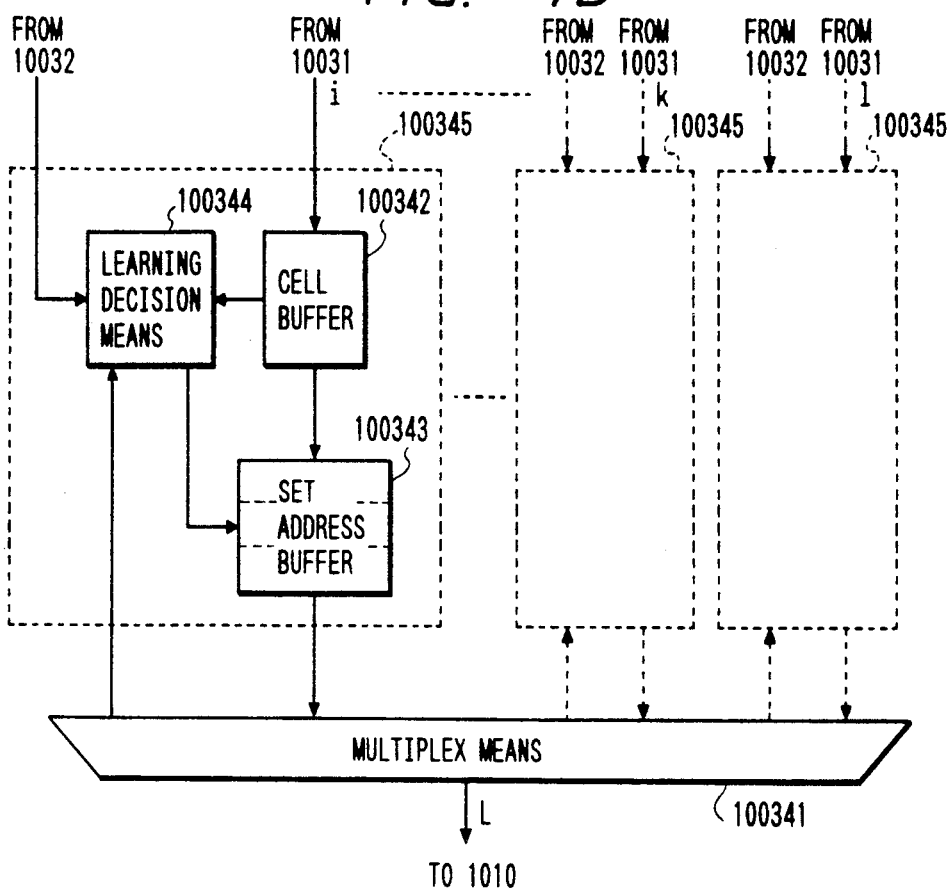

The FDB controller 1010 includes an FDB arbitrator 10111 having the function of controlling the upward filtering/learning request, the downward learning request and the learning request from the learning cell multiplexer 10034, the sending of command of the search/unused entry search/entry registration or the like to the entry table 1011, and further returning the result to the filtering request source in accordance with the search result (Found, Not Found) from the entry table 1011; a write REG 10112 for storing the station address or the three-set address information (station address, node address, port address) at the search/entry registration state to the entry table 1011; a read REG 10113 for storing the search result (node address, port address) of the entry table 1011; a three-set address REG 10114 for storing the three-set address information 100346 from the multiplex means 100347 in FIG. 4B; and a selector.

(1) The FDB arbitrator 10111 has an arbitrating circuit for allowing the operation of the entry table among the filtering request (①) and the learning request (②) from the transmission transfer controller 10081, the learning request (③) from the learning decision means 10066, the learning request (④) from the multiplex means 100341 in accordance with following priority. The priority highest in the filtering request is (①), followed by ②, ③, ④. Thereby, the filtering and forwarding performance of the port 10A (bridge) to the frontend LAN frame can be improved.

(2) Further in accordance with the arbitration result, the FDB arbitrator 10111 takes the information necessary for operating the entry table through the selector from the key address REG 10082, the three-set address REG 10114 or the address information REG 10067 connected to the write REG 10112, and sends the search command for the filtering request and the search/unused entry search/entry registration command for the learning request to the entry table 1011. As a result, it follows that:

(a) At the filtering request: The value of the write REG 10112 (destination station address) is used as the retrieval key to search the station address field of the entry table.

① Found: If three sets coincident with the retrieval key are found in the entry table 1011, the values of the three-set node address and the port address are returned from the entry table 1011 to the read REG 10113, and further a found signal is sent to the FDB arbitrator 10111.

② Not Found: If three sets coincident with the retrieval key are not found in the entry table 1011, a Not Found signal is sent from the entry table 1011 to the FDB arbitrator 10111, and the FDB arbitrator 10111 resets the read REG 10113 and makes the value all "0".

If the result of the filtering is settled, the FDB arbitrator 10111 informs the finishing to the request source.

(b) At the learning request: The FDB controller 1010 uses the source station address among the three-set address information of the write REG 10112 as the retrieval key to search the station address field. If three sets coincident therewith are found (Found state), the values of the source node address and the source port address among the three-set address information of the write REG 10112 are set (overlaid) to the node address and the port address of the entry. In the Not Found state, the unused entry is searched, and values of the three-set address information of the write REG 10112 are registered to the entry. When the station address is registered to the entry table, the value of the most significant bit (I/G bit) always becomes "0".

4. 4 Filtering and Forwarding

An embodiment of the transmission controller 1008 and the cell buffer 1009 after the filtering request to the FDB means 1016 in the upward forwarding will be described.

4. 4. 1 Case 1

The three sets coincident with the destination station address 951 can not be found in the FDB means 1016.

The case that any is not learned in the entry table at the initial state after the system rise or the case that the destination station address 951 is broadcast (I/G bit=1) address or the like corresponding to this. The transfer frontend LAN frame 950 must be transmitted by broadcast to the backbone LAN side by the cell 963.

From the FDB means 1016 together with the finishing notice, the all "0" (Not Found) is sent to the destination node/port address REG 10084. The forward/discard decision means 10085 in FIG. 5 compares value of the self node/port address REG 10089 with value of the destination node/port address REG 10084. If both are not coincident as a result of the comparison and the values of the destination node/port address REG 10084 are all "0", the forward/discard decision means 10085 informs the transmission transfer controller 10081 and the cell header generator 10086 of the broadcast forwarding. The self node/port address REG 10089 is initially set by the microprocessor 1013, but the all "0" is not used in the value.

(1) The transmission transfer controller 10081 has the function of transferring the transfer fronted LAN frame 950, for example, in 4-byte unit repeatedly from the receive buffer 10121 to the cell buffer 1009 as described in 4. 2, controlling the cell 963 generation, transferring the cell position (PSN) information and the effective length (LSN) of the cell information field to the cell header generator 10086 in accordance with the specification explained in the description of FIGS. 2B-2D, 2F, and is constituted by a comparator, a subtractor and the like.

The algorithm regarding calculation of values of PSN, LSN and detection of the transfer finishing is shown as follows.

If a total length (Lt) of adding a length (Lr) of a forwarding function header and a length designated by the length register 10084 is equal to or shorter than a length ($L_c$) of the cell content field.

"PSN=First, LSN=No meaning" is transferred, and an operation (Lt←Lt−Lc) is executed in the transmission transfer controller 10081. For the next cell, if the new Lt is longer than the Lc, "PSN=Next, LSN=No meaning" is transferred on the operation (Lt←Lt−Lc) is executed again in the transmission transfer controller 10081. This process is repeated, and when the new Lt finally becomes equal and shorter than the Lc.

"PSN=Last, LSN=Lt" is transferred from the transmission transfer controller 10081.

Figure 11:
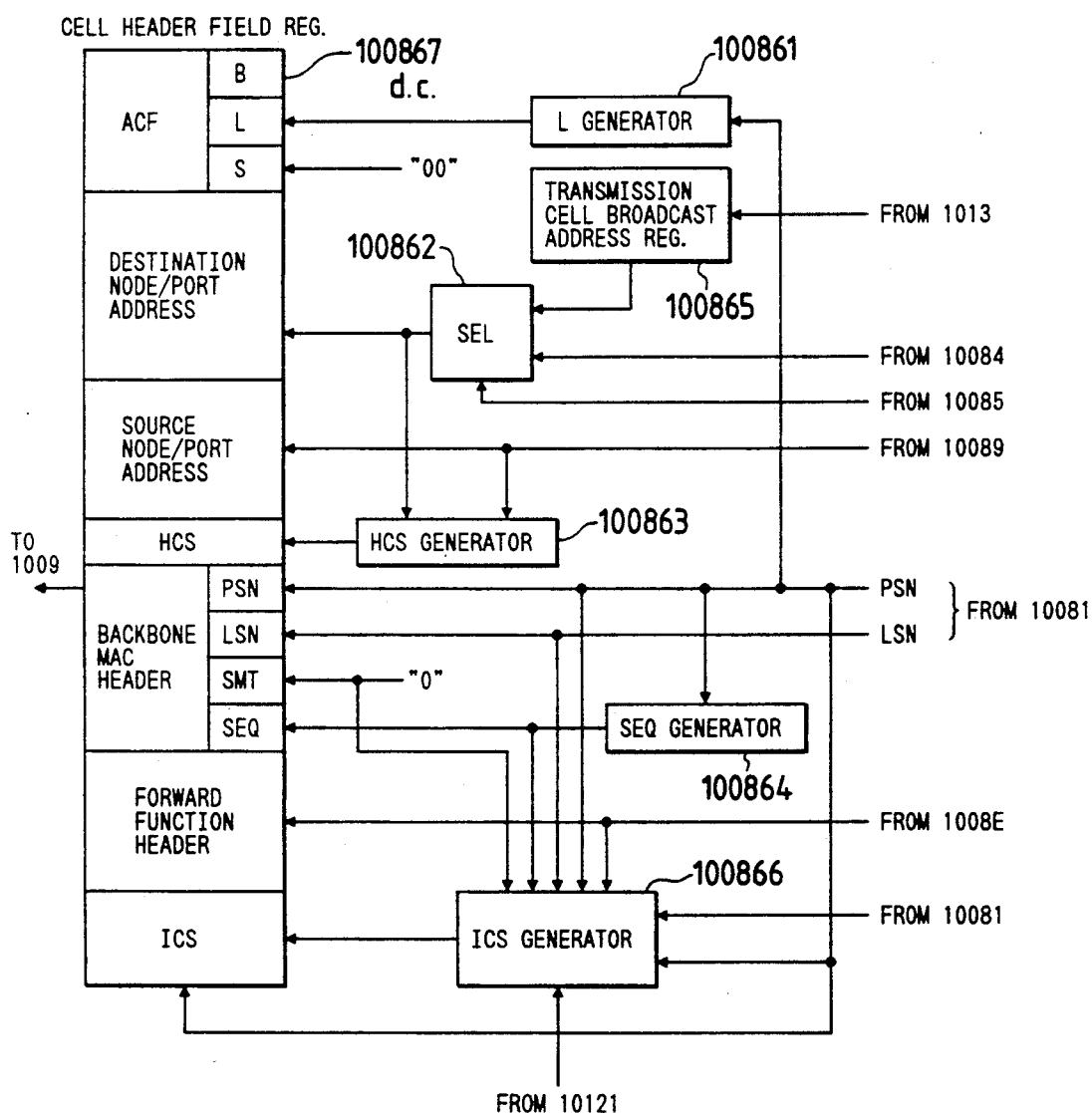
FIG. 11 is a block diagram illustrating operation of a cell header generator 10086 in FIG. 5.

(2) The cell header generator 10086 generates a cell header as shown in Table 3, and stores it in the address of the cell buffer 1009 assigned by the write pointer controller 10087. FIG. 11 is a diagram illustrating an embodiment of the cell header generator 10086. In FIG. 11, an L generator in accordance with the PSN value, 100861 generates "1" the first (10) state or the single (11) state, and generates "0" at any other state. A SEL 100862 selects whether the set value to the destination port address is made the value from a destination node/port address REG 10084 or the value from a transmission cell broadcast address REG 100865 in accordance with the broadcast/individual forwarding command from the forward/discard decision means 10085. The microprocessor performs the initial setting to the transmission cell broadcast address REG 100865.

As an embodiment of the initial set value, Table 3 indicates the values of the destination node/port address 956. In embodiment (a), the value for the simultaneous broadcast address is all "1", and it is intended that the cell is received by all 10A ports. In embodiment (b), the value is the most significant bit=1, and the remaining part becomes the group ID broadcast address, and it is intended that the cell is received by the specified 10A port group. The system application example of these embodiments will be described later.

An HCS generator 100863 inputs destination node/port address value and the source node/port address value from the self node/port address REG, and generates the error check code (HCS). An SEQ generator 100864 is constituted by an incrementor, a NAND circuit and the like, and generates a sequence number using any algorithm in the next embodiment. In (a), the SEQ value starts from "0" in unit of the transfer frontend LAN frame, but in (b), (c), the SEQ value is supplied in serial number throughout all frontend LAN frames transferring to the switch means 1003 of the port 10A.

TABLE 3

| Values of Cell Header (at broadcast forwarding) | | |
|---|---|---|
| Field | | Values |
| ACF | B | d.c. (set by the switch means 1003) |
| | L | "1" at Single cell, First cell |
| | | "0" at other state |
| | S | 00 (asynchronous cell) |
| destination node/port address | | embodiment (a) |
| | | "11----1" simultaneous broadcast address |
| | | embodiment (b) |
| | | "1xx---x" group broadcast address |
| | | xx---x is group ID, and arbitrary 0/1 pattern excluding all "1" |
| source node/port address | | value of the self node/port address REG 10089 |
| HCS | | calculated value |
| frontend MAC header | PSN | value from the transmission transfer controller 10081 |
| | LSN | value from the transmission transfer controller 10081 |
| | SMT | 0 |
| | SEQ | refer to explanation |

TABLE 4

| Set Values of Forwarding Function Header | | |
|---|---|---|
| Field | | Values |
| forwarding function header | III | 110 (FDDI) |
| | R | 2 (non-source routing) |
| | DDDD | 0 |
| | SSSS | 0 |

(a) At generating the First cell, initialization is to SEQ=0. At the Next and Last cells, the previously generated SEQ value +1 is used as the present SEQ value. At generating the Single cell, SEQ=0.

(b) Initialization is set to SEQ=0 by reset of the power ON or the like. At generating arbitrary cell, the previously generated SEQ value +1 is used as the present SEQ value.

(c) Initialization is set to SEQ=0 by the reset of the power ON or the like. At generating the First, Next or Last cell, the previously generated SEQ value +1 of the First, Next or Last cell is used as the present SEQ value. At generating the Single cell, SEQ=0.

An ICS generator 100866 inputs the transfer data from the receive buffer 10121, and also inputs values of the backbone MAC header and the forward function header. According to the transfer data input notice and the cell generation notice from the transmission transfer controller 10081, the error check code is generated for the cell content field 961 including the backbone MAC header, the forward function header (only at the First or Single cell). Then the ICS generator 100866 is reset in response to the reset command from the transmission transfer controller 10081. The ICS generator 100866 repeats the above operation at every cell generation notice. The header values thus generated are stored in a cell header field REG 100867, and then stored to each field of a corresponding cell of the cell buffer 1009.

(3) The cell buffer 1009 will be described next.

The value generated in the cell header generator 10086 and a part of the transfer frontend LAN frame 950 from the receive buffer 10121 are stored in cell 963 form within the cell buffer 1009 in accordance with the address assignment of the write pointer controller

10087. The cell buffer can store a plurality of (for example, four pieces) cells. The read pointer controller 10088 compares the write pointer value from the write pointer controller 10087 with the self read pointer value, thereby the controller 10088 can know whether the cell buffer 1009 is "Not empty" (One or more cells exist) and inform the switch means 1003 of the cell transmission request. The read pointer controller 10088 and the write pointer controller 10087 are initialized by the reset of the power ON or the like, and the cell buffer 1009 becomes empty.

(4) The transmission transfer controller 10081 repeats the above-mentioned operation. If the upward transfer of the transfer frontend LAN frame corresponding to the setting by the length REG 1008A and the cell generation accompanying with this are finished, the controller 10081 sets value (=broadcast transmission) to the upward transfer finishing status REG 1008C and further sets value (=0) in the remained length REG 1008D.

4. 4. 2 Case 2

Next is the case when the three sets coincident with the destination station address 951 exist in the FDB means 1016. The three sets of node address and port address coincident with the destination station address together with the finishing notice are returned from the FDB means 1016 to the destination node/port address REG 10084. In similar manner to Case 1, the comparison results with the self node/port address are classified into following cases.

In the case when coincident, the station assigned by the destination station address 951 exists on the frontend LAN 25 to which the port 10A is connected, and the transfer frontend LAN frame 950 should be discarded. The forward/discard decision means 10085 informs the transmission transfer controller 10081 of the discard. As described above, the transmission transfer controller 10081 issues the learning request to the FDB means 1016, and then interrupts the upward transfer and sets value (=discard) to the upward transfer finish status 1008C. The difference between the value of the length REG 1008A set at the transmission starting state and the frame length of the transfer frontend LAN transferred before the transfer interruption is stored in the remained length REG 1008D. The generation cancel is provided to the write pointer controller 10087, and a part of the cell being generated in the cell buffer 1009 is erased, and further the generation cancel is provided to the cell header generator 10086 and the update of the SEQ generator 100864 is suppressed. Because the generation cancel notice is performed before the generation finishing of the First cell or the Single cell, a part or the whole of the transfer frontend LAN frame to be discarded is not transmitted as the cell to the switch means 1003.

4. 4. 3 Case 3

In the case when not coincident, the station assigned by the destination station address 951 exists on the frontend LAN 25 to which a port 10A other than the above-mentioned port 10A is connected, and the transfer frontend LAN frame 950 should be forwarded to the backbone LAN side. The forward/discard decision means 10085 performs decision similar to that described in 4. 4. 1. When the value of the destination node/port address REG 10084 is different from value of the self node/port address REG 10089, and when the value of the destination node/port address REG 10084 is not all "0", the transmission transfer controller 10081 and the cell header generator 10086 are informed of the individual forwarding. Subsequent operation is similar to the operation described in 4. 4. 1 except for the following points.

(a) The value of the destination node/port address REG 10084 is set to the destination node/port address 956.

(b) The value (=individual transfer) is set to the upward transfer finish status REG 1008C.

5. Switch Means

FIG. 4A is a detailed constitution diagram of a switch means 1003. The switch means 1003 comprises a highway selector 10035, a learning cell multiplexer 10034, and highway processors 10030 i —l corresponding to highways i, j, k, l.

Access system of the switch means is based on so-called slotted ring system, and is an extended system to enable access of a plurality of highways. In following description, a plurality of ports as a whole in the node are abbreviated as ports-x 10A(x), wherein x=i, j, k, l. An individual port is abbreviated, for example, as a port-i 10A(i). The ports-x 10A(x) and the highway selector 10035 are connected by lines designated TC, which T corresponding to the ports.

5. 1 Cell Transmission

A port-j 10A(j) will now be described. The other ports act similarly. On receiving the cell transmission request from the read pointer controller 10088, the highway selector 10035 informs the read pointer controller 10088 of the transmission allowance, and pulls out one cell from the cell buffer 1009 and stores it to an analysis buffer (not shown), which exists in accordance with ports 10A(i)–10A9(l), within the highway selector 10035, and decides the most significant bit value in the destination node/port address of the cell. If the value is "1", representing a simultaneous broadcast address a or a group broadcast address, transfer to the cell buffers 10036 of all highways is performed. In this case, if the cell buffer 10036 of the destination highway is full, the transfer to the cell buffer 10036 is delayed until an empty space is produced in the cell buffer.

If the destination node/port address is an individual address, the most significant bit=0, the cell is transferred to the cell buffer 10036 of the highways i, j, k, l respectively, in accordance with values 00, 01, 10, 11 of the destination port address (lower two bits in the destination node/port address 956, refer to Table 2). However, if the cell buffer is full, the transfer is delayed until an empty space is produced in the cell buffer. If the transfer to the cell buffer 10036 is delayed irrespective of value of the destination node/port address, the analysis buffer remains in use. Consequently, for the next cell transmission request from the port-j 10A(j), the highway selector 10035 delays the notice of the transmission allowance to the read pointer controller 10088. As a result, the cell in accordance with the transmission request remains in the cell buffer 1009. The highway selector 10035 repeats the above operation every time the cell transmission request is received.

The cell transferred to the cell buffer 10036 is overlaid to an empty cell (cell at B of ACF=0), detected by the transmission selector 10033, and is made a cell in use (cell at B of ACF=1) and transmitted to the multiplexer 1004. When the cell buffer 10036 is empty, the transmission selector 10033 forwards the cell jY as it is from the receive register 10031 to the multiplexer 1004, as long as the cell removing request jb does not come from the receive decision means 10032.

5. 2 Cell Receiving

Next, the receiving of the cell will be described. When a cell corresponding to one cell of the highway j is stored to the receive register 10031 by a cell boundary signal of the highway j and the cell data input through the demultiplexer 1002, the receive decision means 10032 is informed of the cell receiving.

In the receive decision means 10032, in order to remove the cell transmitted by the transmission selector 10033 of the highway j from the backbone LAN loop, the source node/port address of the cell in the receive register 10031 is compared with the self node/port address REG 10037. When both are coincident, the transmission selector 10033 is informed of the cell removing request jb. The self node/port address REG 10037 is initialized by the microprocessor 1000. In the transmission selector 10033 receiving the cell removing request jb, the value of B of the ACF of the cell transferred from the receive register 10031, after a definite time, is made "0" emptying the cell.

The cell is transferred from the receive register 10031 to the transmission selector 10033 and to the learning cell multiplexer 10034, and further transferred by the R line, to the receive controller 1006 of the port-j 10A(j). The receive decision means 10032 performs the error check of the HCS, and informs the receive controller 1006 of the port-j 10A(j) by the RC line, the learning cell multiplexer 10034 and the transmission selector 10033 of the presence/absence of the cell boundary signal and the HCS error the other highways i, k, l act similarly.

As described above, the port 10A can perform the cell receiving through the R line from only the specific highway. For example, the port-k 10A(k) can perform the receiving from only the highway k. On the other hand, the cell transmission from the port 10A is possible to an arbitrary highway through the T line and the TC line depending on the port address value of the destination node/port address.

5. 3 Learning Cell Multiplexer

FIG. 4B is a diagram showing constitution of a learning cell multiplexer 10034. The learning cell multiplexer 10034 includes learning judgement means 100345 corresponding to highways, and a multiplex means 100341. Each learning judgement means 100345 includes a learning decision means 100344, a cell buffer 100342, and three-set address FIFO buffer 100343.

A cell from the receive register 10031 of the highway is stored to the cell buffer 100342. Upon receiving the cell boundary signal and notice regarding absence of the HCS error from the receive decision means 10032, the learning decision means 100344, having an ICS checker circuit of an ICS 962 with a cell content field and a backbone MAC header being error-checked, performs a decision regarding the following three conditions.

① In an ACF of a cell within the cell buffer 100342, L=1 and B=1.

② In the destination node/port address 956, the most significant bit=0 (no broadcast signal).

③ The ICS error check of the cell is performed, and the absence of the ICS error is detected.

Figure 4C:
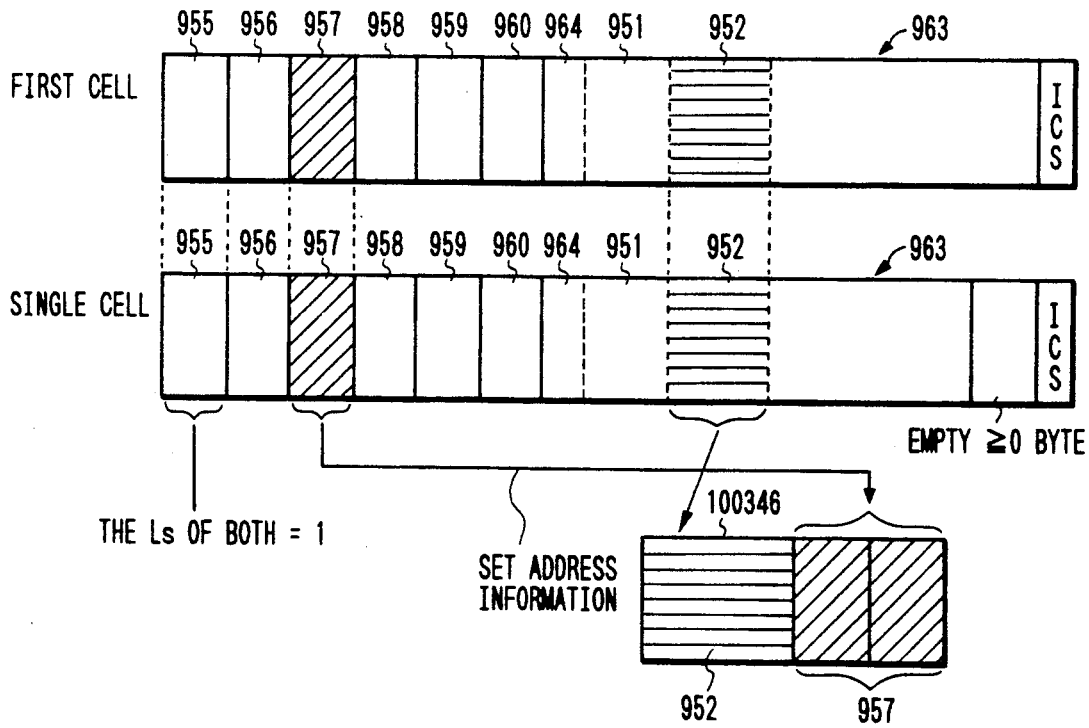

Only when all three conditions are satisfied, as shown in FIG. 4C, will the source station address 952 and the source node/port address 957 of the cell extract and store in the form of the three-set address information 100346 in the three-set address buffer 100343. This storage is performed only when an empty space exists in the three-set address buffer 100343. A cell in the cell buffer 100342 not satisfying the three conditions is overlaid by the next received cell. It is easily analogized that, in place of deciding the three conditions ①, ②, ③, other embodiment of deciding the two conditions ①, ③ excluding ② can be realized in similar manner to the above description. The learning judgement means 100345 corresponding to other highways repeat a similar operation.

The multiplex means 100341 takes the three-set address information 100346 from the three-set address buffer 100343 of i, j, k, l, for example, in the order of i, j, k, l, i, j, ——, and transmits the information together with the learning request notice to the L line. As a result, the three-set address information from all highways can be commonly learned by the FDB means 1016 of all 10A ports. If the three-set address information does not exist in the three-set address buffer 100343, the learning request is not transmitted to the L line. The learning decision means 100344 performs the write pointer control and the read pointer control for the three-set address buffer 100343 thereby performing the FIFO control of the three-set address buffer 100343.

6. Downward Forwarding from the Backbone LAN to the Frontend LAN

6. 1 Assembling of Forward Frontend LAN Frame

Next, returning to the port 10A, the operation of the receive controller 1006 and the re-assemble buffer 1007 will be described referring to FIG. 6 and FIG. 10.

Figure 6:
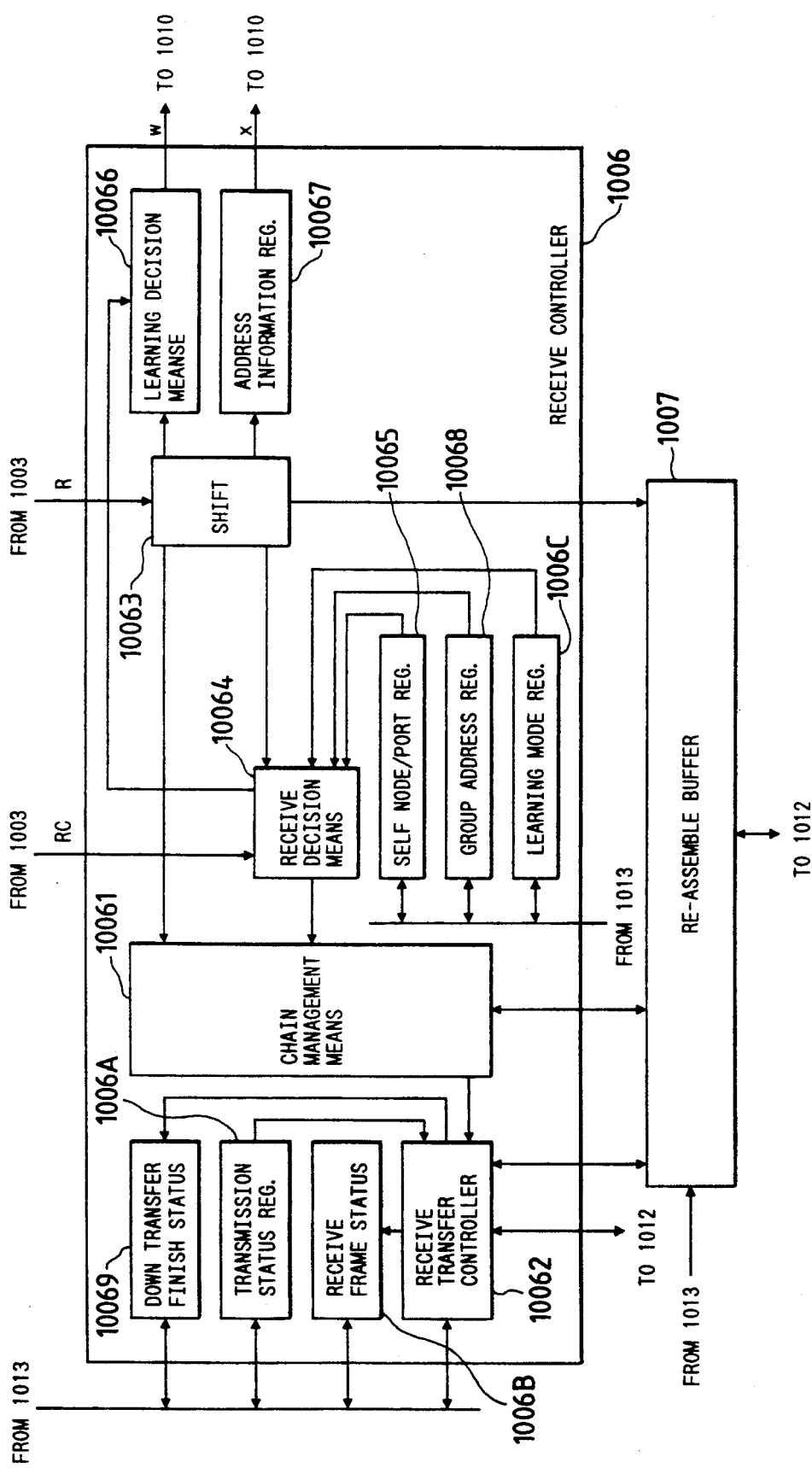
FIG. 6 is a block diagram of an embodiment of a receive controller 1006 in the node of FIG. 1.

(1) In FIG. 6, a SHIFT 10063, a buffer corresponding to one cell, receives all cells on the highway j which can be received by the port-j 10A (j) from the switch means 1003 through the R line. The transfer at the R line is repeated, for example, in units of 16 bits.

A receive decision means 10064 receives the cell boundary notice and the presence/absence of HCS error from the RC line. If any HCS error exists, the received cell is ignored and next cell is received. On the other hand, if no HCS error is found and when B=1 at the ACF of the received cell, the receive decision means 10064 checks the ICS of the cell within the SHIFT 10063 and the destination node/port address in following manner.

(a) An ICS check circuit is provided within the receive decision means 10064. The error check, detecting bit error, is performed using the ICS 962. If any ICS error exists, the received cell is ignored and next cell is received.

(b) If no ICS error is found, a decision regarding the value of the destination node/port address is performed. Among following conditions ① the value of the destination node/port address is coincident with value of the self node/port REG 10065, or ② the value of the destination node/port address is coincident with value of the group address REG 10068, or ③ the value of the destination node/port address is a simultaneous broadcast address (=all "1"), if any one is satisfied, a chain management means 10061 is informed of the address coincidence V. The values of the self node/port address REG 10065 and the group address REG 10068 are previously initialized by the microprocessor 1013. It is easily analogized that the group address REG 10068 is not limited to one in number, but a plurality of the registers may be provided and the different group address values are initialized thereby the cells corresponding to plural sorts of the group address can be received. If any of ①, ②, ③ is not satisfied, the chain management means 10061 is informed of the address non-coincidence, and the informed chain management means 10061 ignores the received cell.

(c) If no ICS error is found, the receive decision means 10064 further informs the permissible/unpermissible of the learning to the learning decision means 10066 by value of the learning mode REG 1006C in accordance with the learning condition of Table 5. Value (0 or 1) of the learning mode REG 1006C is previously initialized by the microprocessor 1013. If any ICS error exists, the learning decision means is informed of the unpermissibleness of learning.

TABLE 5

| | Learning Condition | |
|---|---|---|
| Value of Learning Mode REG | Value of Destination node/port Address of Cell within SHIFT 10063 | Notice to Learning Decision Means 10066 |
| 1 | no relation | learning permissible |
| 0 | coincident with value of self node/port REG 10065, or coincident with value of group address REG | learning permissible |
| | other condition | learning not permissible |

The receive decision means has a circuit for performing decision and an ICS error check as above described.

(2) In concurrence with the above-mentioned operation, the address information REG 10067 takes the source station address and the source node/port address from the cell within the SHIFT 10063, as described in the explanation of FIG. 4C, and prepares the three-set address information 100346. The learning decision means 10066 decides the L values of the cell ACF within the SHIFT 10063. If L=1 (learning necessary) and the learning is permissible notice is received from the receive decision means 10064, the learning decision means 10066 notices the downward learning request to the FDB means 1016. As a result, the FDB means 1016 learns the three-set source address information (station address, node address, port address) stored in the address information REG 10067.

(3) On receiving notice of the address coincidence from the receive decision means 10064, the chain management means 10061 checks PSN and SEQ of the backbone MAC header as hereinafter described. If no error is found and the assembling of the transfer frontend LAN frame is finished (Single cell or Last cell received), the chain management means 10061 informs the receive transfer controller 10062 of the receive finishing.

(4) The chain management means 10061 includes a check circuit for performing PSN/SEQ error check, an access control circuit for transferring data from the SHIFT 10063 to the re-assemble buffer 1007 or for the read/write of data from the re-assemble buffer 1007 by the chain management means 10061 itself, a so-called sequence control circuit capable of operating the later described data structure within the re-assemble buffer 1007, and the like. The re-assemble buffer 1007 is a so-called three-port buffer memory, and can be accessed concurrently by the chain management means 10061, the receive transfer controller 10062 and the FDDI access means 10123. During the data transfer from the SHIFT 10063 to the re-assemble buffer 1007, the chain management means 10061 suppresses its own access to the re-assemble buffer 1007.

Figure 10A:
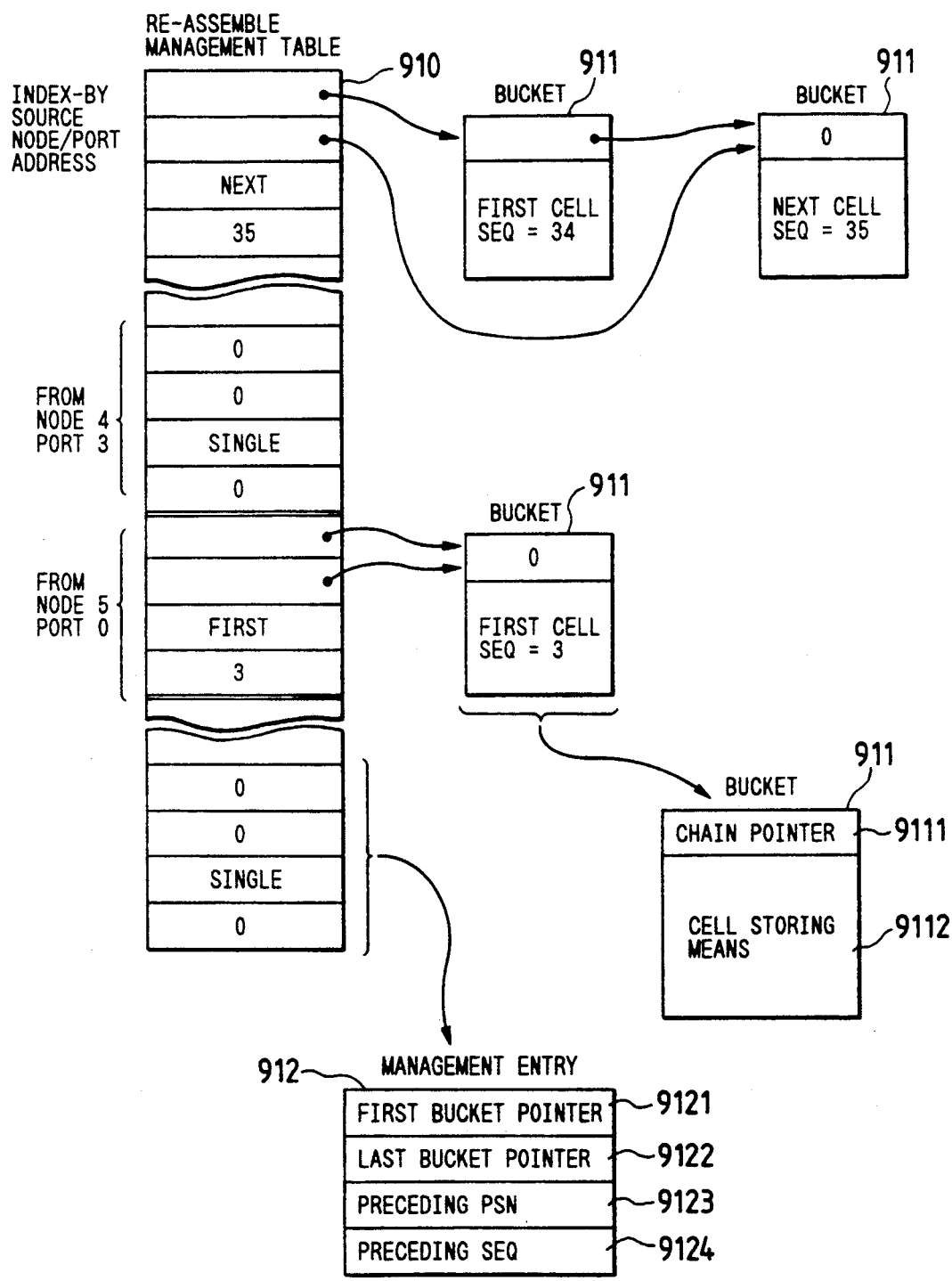
FIGS. 10A–10C are explanation diagrams of reassemble processing executed by a receive controller 1006 in FIG. 1 and FIG. 6.
Figure 10B:
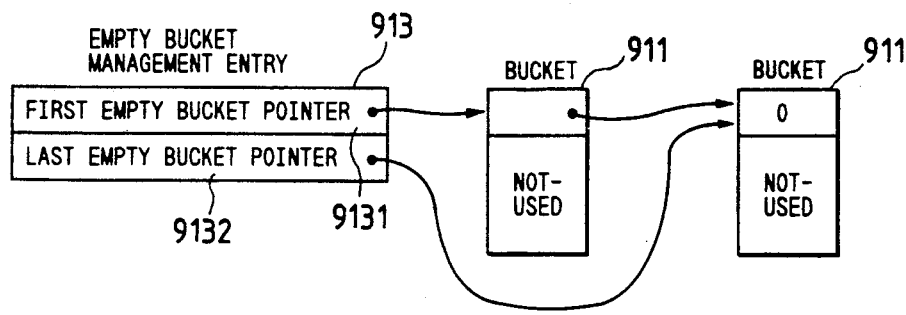
Figure 10C:
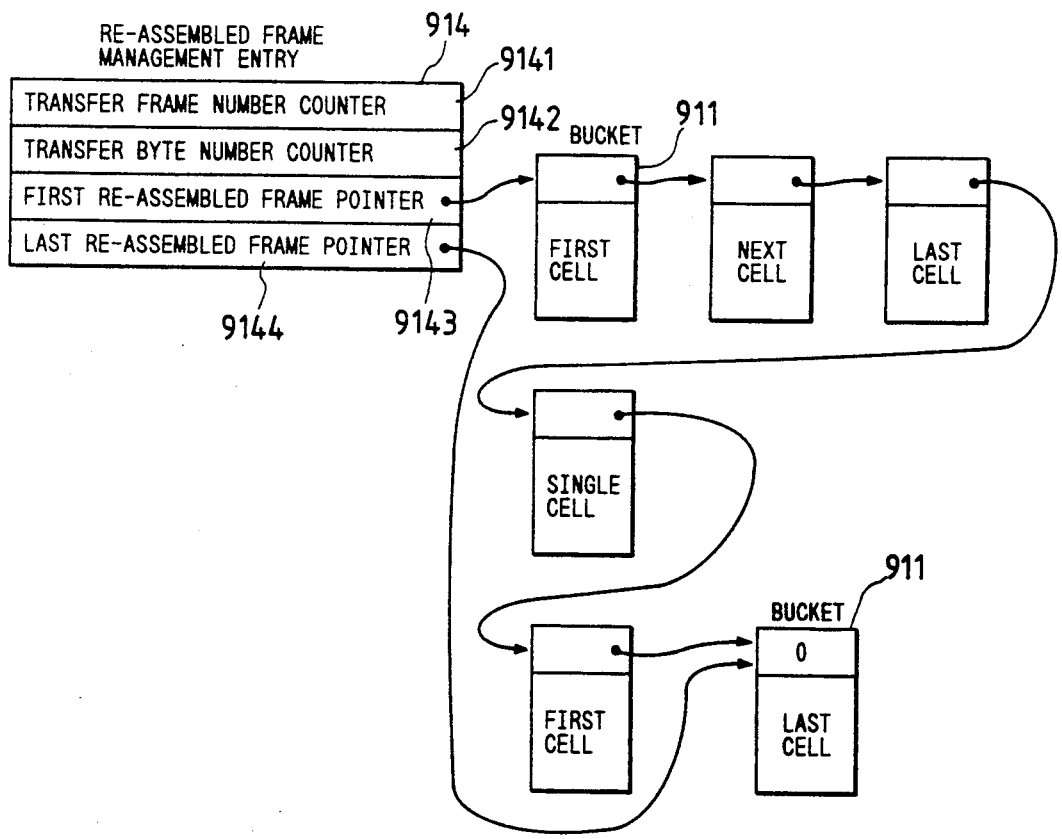

(5) Logical data structure within the re-assemble buffer 1007 is shown in FIGS. 10A to 10C.

The re-assemble management table 910 in FIG. 10A is a table for performing the error check of PSN, SEQ and the assembling of the transfer frontend LAN frame corresponding to the port 10A of the source, and has an arrangement where a management entry 912 is one entry. The management entry 912 conforms with the maximum constitution of the backbone LAN 0 (for example, $2^9 \times 2^2$ in the node/port address constitution of Table 2), thereby a cell from an arbitrary port 10A of an arbitrary node 10 can be received. The management entry 912 corresponding to the port 10A of the source includes a first bucket pointer 9121, a last bucket pointer 9122 for chaining a container called a bucket 911 to store cells, a preceding PSN 9123, a preceding SEQ 9124 for storing the cell values of PSN and SEQ previously received from the source port. The bucket 911 includes a chain pointer 9111 for chaining the bucket itself, and a cell storing means 9112. The cell storing means 9112 has both embodiments for both storing and not storing the ACF. Both have no difference in following description.

In FIG. 10B, a first empty bucket pointer 9131 and a last empty bucket pointer 9132 of an empty bucket management entry 913 are used for the maintenance of an unused bucket 911.

In FIG. 10C, a re-assembled frame management entry 914 manages the re-assembled cell group, that is, the single cell of First/Next/Last cell(s) generated (divided) from one frontend LAN frame by a first re-assembled frame pointer 9143 and a last re-assembled frame pointer 9144 in the FIFO manner. A transfer frame number counter 9141 and a transfer byte number counter 9142 count the transfer frontend LAN frame number, transferred from the re-assemble buffer to the FDDI access controller, and the total byte number of these frames.

The bucket 911 is connected to the re-assemble management table 910 or the empty bucket entry 913 of the re-assembled frame entry 914 depending on the respective cases.

In following description, data structure composed of a pair of first some pointers, a last some pointer and a bucket group chained by these pointers for realizing the FIFO manner is called queue. "Connecting" to the queue means that a bucket is chained to the end of the queue, and "taking" from the queue means that a bucket at the top of the queue is removed from the chain.

The re-assemble buffer 1007 is initialized by the microprocessor 1013 as follows.

① All buckets are chained to an empty bucket queue.
② A re-assembled frame queue is made empty (first and last re-assembled frame pointers=0).
③ The bucket queue of each management entry 912 is made empty, and the preceding PSN and the preceding SEQ are made single and 0 respectively.

(6) First, the error check of PSN and SEQ will be described.

The chain management means 10061, using the value (=t) of the source node/port address of the received cell within the SHIFT 10063 as an index reads the t-th management entry of the reassemble management table 910 (hereinafter designated by ENT(t)) to obtain the preceding PSN and the preceding SEQ.

Further, the PSN and the SEQ of the backbone MAC header of the received cell (hereinafter referred to as the existing PSN and the, existing SEQ respectively) are obtained from these values, check is performed based on Table 6 and Tables 7-1, 7-2, 7-3. And then the chain management means 10061 sets the values of the existing PSN to the preceding PSN 9123.

TABLE 6

PSN Error Determining Table

| Preceding PSN | Existing PSN | | | |
|---|---|---|---|---|
| | Single | First | Next | Last |
| Single | ① | ③ | x | x |
| First | x | x | ⑤ | ⑦ |
| Next | x | x | ⑥ | ⑧ |
| Last | ② | ④ | x | x |

①: no PSN error
x: PSN error existing
(i = 1–8 referred in SEQ Error Determining Tables 7-1, 7-2, 7-3)

The error check of SEQ is performed, regarding the received cell, where no error is found in the PSN error check. This method is shown in the SEQ error determining tables (Tables 7-1, 7-2, 7-3) corresponding to the SEQ generators (a)–(c) described in 4.4.1 (2). The chain management means 10061 performs the error check, and then performs processing shown in post-conditioning of each table.

In Tables 7-1, 7-2, 7-3, MOD 128 indication is performed.

TABLE 7-1

SEQ Error Determining Table [for Embodiment (a)]

| PSN Check Results | Condition for No Error | Post-conditioning |
|---|---|---|
| ①, ②, ③, ④ | existing SEQ = 0 | preceding SEQ 9124 ← 0 |
| ⑤, ⑥, ⑦, ⑧ | existing SEQ = preceding SEQ + 1 | preceding SEQ 9124 ← existing SEQ |

Note: refer to Table 6 for ①–⑧

TABLE 7-2

SEQ Error Determining Table [for Embodiment (b)]

| PSN Check Results | Condition for No Error | Post-conditioning |
|---|---|---|
| ①, ②, ③, ④ | (existing SEQ not checked) | preceding SEQ 9124 ← existing SEQ |
| ⑤, ⑥, ⑦, ⑧ | existing SEQ = preceding SEQ + 1 | preceding SEQ ← existing SEQ |

Note: refer to Table 6 for ①–⑧

TABLE 7-3

SEQ Error Determining Table [for Embodiment (c)]

| PSN Check Results | Condition for No Error | Post-conditioning |
|---|---|---|
| ①, ②, ③, ④ | (existing SEQ not checked) | preceding SEQ 9124 ← existing SEQ |
| ⑤, ⑥, ⑦, ⑧ | existing SEQ = preceding SEQ + 1 | preceding SEQ 9124 ← existing SEQ |

Note: refer to Table 6 for ①–⑧

When the PSN error or the SEQ error is detected, the chain management means 10061 does not transfer the received cell to the re-assemble buffer 1007. In the received cell, if PSN=Next or Last, from the bucket incorporating the First cell chained to the bucket queue of the management entry ENT(t), unless the chain pointer value of the bucket=0 (the end of the chain), the chain pointer of the bucket is followed repeatedly, thereby each bucket incorporating the Next cell of 0 or more in number is found and connected to the empty bucket queue.

(7) If neither PSN error nor SEQ error is found, the chain management means 10061 takes one bucket from the empty bucket queue and stores the received cell to the cell storing means. If the received cell is a Single cell, it is connected to the re-assembled frame queue. Otherwise the bucket storing received cell is connected to the bucket queue of the management entry ENT(t). If the received cell is a last cell then all the buckets, between the bucket incorporating the First cell chained to the bucket queue through the bucket incorporating the Last cell, are connected in the order of the chain as it is to the re-assembled frame queue. Whenever the bucket is connected to the re-assembled frame queue by receiving the Single cell or the Last cell, the chain management means 10061 notices the receive finishing sent to the receive transfer controller 10062. Further, the preceding PSN of the corresponding management entry is made single, and the first bucket pointer and the last bucket pointer are made 0. The chain management means 10061 repeats the above-mentioned operation on each received cell. On receiving the receive finishing notice, the receive transfer controller informs the receive frame status 1006B of the finishing notice presence.

6. 2 Operation of Program

Figure 9B:
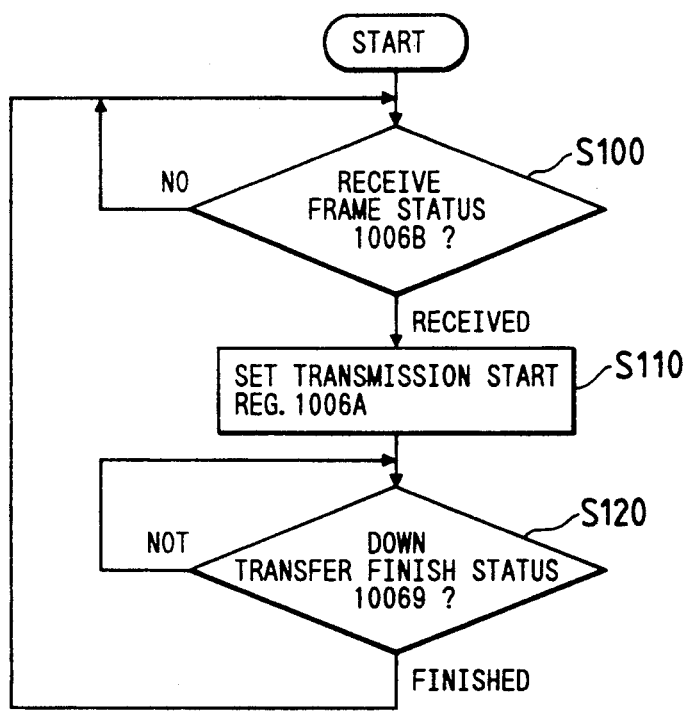

FIG. 9B is an example of a program chart executed by the microprocessor 1013. In S100, the receive frame status 1006B decides whether the re-assembled transfer frontend LAN frame 950 exists in the reassemble buffer 1007. If it is not received, S100 is repeated. If it is received, the transmission start REG 1006A is set in order that the transfer frontend LAN frame 950 can be transmitted through the FDDI access means 10123 to the frontend LAN 25. Then in order to confirm whether the transfer to the frontend LAN 25 is finished, the downward transfer finish status 10069 is decided in S120. If it is not finished, the S120 is repeated. If it is finished, process goes to S100 so that the presence of next transfer frontend LAN frame can be decided.

Regarding the repeated loop of S10, S60, S100 and S120 in FIGS. 9A, 9B, state that the microprocessor 1013 is exclusively used for the processing of such loop can be easily prevented in that programs in FIGS. 9A, 9B and the like are operated under the OS program generally used having function of the interrupt control, the time slice execution control of program and the multitask scheduling.

6. 3 Transmission to the Frontend LAN (1) The receive transfer controller 10062 of the receive controller 1006 includes a, so-called sequence control circuit capable of operating the data structure in a shown in FIGS. 10A to 10C, adder/substractor/comparator circuits, a DMA transfer control circuit connecting the re-assemble buffer 1009 to the FDDI access means 10123, and the like.

(2) If the transmission start REG 1006A is set in S10, according to the starting signal from the transmission start REG 1006A, the receive transfer controller 10062 notices the frontend LAN from transmission request sent to the FDDI access means 10123. If the token goes round on the frontend LAN 25 and the FDDI access means 10123 receiving the transmission request picks up the token, notice of the transmission ready is returned from the FDDI access means 10123 to the receive transfer controller 10062. Subsequently the DMA transfer control is performed between both, the frontend LAN frame is transmitted from the re-assemble buffer 1007 through the FDDI access means 10123 to the frontend LAN 25. Then the receive transfer controller 10062 takes only the hatched portion of each cell on FIG. 2F, i.e., portion of the transfer frontend LAN frame, and transfer it to the FDDI access means 10123.

(3) First, the receive transfer controller 10062 performs a "0" clear of the transfer frame number counter 9141 and the transfer byte number counter 9142.

(4) Next, the cell within the bucket 911 is accessed starting from the bucket 911 indicated from the first re-assembled frame pointer 9143 of the re-assembled frame management entry. In accordance with values of PSN and LSN of the cell, the address and length within the cell to be started in the transfer are known, and the length is added to the transfer byte number counter and the net data (the hatched portion in FIG. 2F) is transferred from the re-assemble buffer 1007 to the FDDI access means 10123. When the transfer in the bucket is finished, the receive transfer controller 10062 takes the bucket from the re-assembled frame queue and connects it to the empty bucket queue. If the PSN of the cell of the bucket is Next cell or First cell, the chain pointer of the bucket is followed and the next bucket is obtained, and the above operation is performed again. If the PSN thereof is Single cell or Last cell, it is recognized that the transfer of one transfer frontend LAN frame is finished, and a "1" is added to the transfer frame number counter.

(5) Since the FDDI access means 10123 acts in accordance with the FDDI MAC system, many frontend LAN frames can be transmitted as long as it is allowed by the token holding time. Consequently, every time the transfer of one transfer frontend LAN is finished, the receive transfer controller 10062 searches the re-assembled frame queue. If nothing is found in the re-assembled frame queue, the change from finishing status to the downward transfer finish status is noticed and a series of processing is finished, and the next starting signal from the transmission start REG is awaited. On the other hand, it the re-assembled transfer frontend LAN frame to be transmitted next exists, the operation similar to (4) is repeated. If the token holding time is over, the FDDI access means 10123 releases the token and notices the receive controller of the token release. On receiving the notice, the receive transfer controller 10062 does not perform new DMA transfer and notices the change from finishing status to the downward transfer finish status, even if the re-assembled transfer frontend LAN frame to be transmitted next exists in the re-assembled frame queue. On the other hand, if the re-assembled transfer frontend LAN frame to be transmitted is over before the token holding time is over, the receive transfer controller notices the token release command sent to the FDDI access means, and also notices the change from the finishing status to the downward transfer finish status. The FDDI access means releases the token. The operation from setting of the transmission start REG until the notice of the finishing to the downward transfer finish status has been described. In addition, the FCS954 is generated by the FDDI access means.

6.4 Forwarding Frame Stripping from the Frontend LAN

As shown in 1.2.2, the embodiment of the frame strip means has a counter circuit, and when the FDDI access means 10123 picks up the token, the count is cleared to "0", and the frontend LAN frame forwarded downward is transmitted from the FDDI access means to the frontend LAN 25, and the transmitted frame number is counted (The final value is H.).

And then, before the FDDI access means 10123 picks up the next token, among the frontend LAN frames received through the serial i/f 10124, the first H pieces of the frames are stripped by the frame strip means 10126. Initialization.

In the above embodiment, register values initialized by the microprocessor 1000 and the microprocessor 1013 are restricted by the following conditions.

① Within each node 10, the node address values of the following registers are made the same. Different values are taken between nodes, and the value all "0" and the value all "1" are not used.

| | |
|---|---|
| self node/port address REG | 10037 |
| self node/port address REG | 10089 |
| self node/port REG | 10065 |

② The port address values of following registers are made the same within the port 10A. The values are made 00, 01, 10, 11 corresponding to highways i, j, k, l received by the port.

| | |
|---|---|
| self node/port address REG | 10089 |
| self node/port REG | 10065 |

Figure 8B:
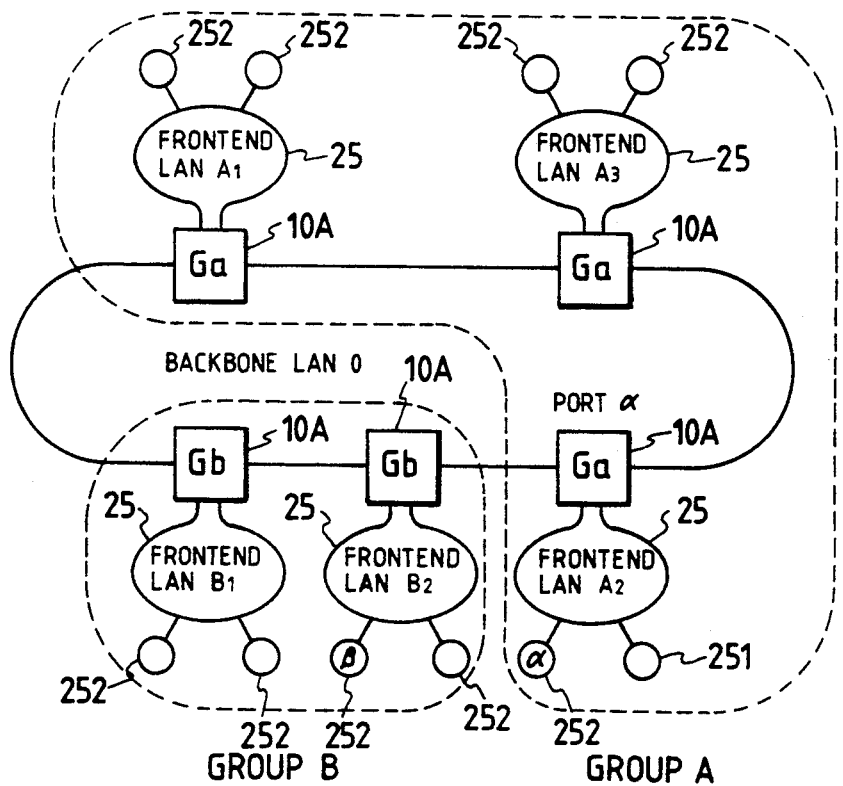

③ Port address values of following register are made 00, 01, 10, 11 corresponding to highways i, j, k, l. self node/port address REG 10037 7. System Application Examples (1) FIG. 8B is a diagram illustrating an application example. In FIG. 8B, in order to emphasize that the frontend LANs 25 are connected in bridge through the ports 10A to the loop of the backbone LAN 0, the loop access controller 100 and highways are omitted. This does not conflict with the description of the above-mentioned embodiment.

As already described in Case 1 (1) of embodiment 4.4, the destination node/port address values of the broadcast cell (in the destination node/port address, the most significant bit=1) have two embodiments, the simultaneous broadcast address (all "1") and the group broadcast address. In this application example, however, the initialization of the simultaneous broadcast address is inhibited in all ports 10A. Otherwise, the same group broadcast address value (=Ga) is used for all of the plurality of ports 10A included in group A. On the other hand, the same group broadcast address value (=Gb) is used for all of the plurality of ports 10A included in group B. Wherein Ga≠Gb.

More specifically, the cell header generator 10086 (FIG. 11) may be referred to. Values (Ga in the group A, and Gb in the group B) are initialized to the transmission cell broadcast address register 100865 by the microprocessor 1013. When the cell header generator 10086 generates the broadcast cell (in the destination node/port address, the most significant bit=1), the register is referred to, and the value is set to the destination node/port address 956 of the broadcast cell. On the other hand, the same values (Ga in the group A, and Gb in the group B) are also initialized to the group address REG 10068 (FIG. 6) of the port 10A by the microprocessor 1013.

In this constitution, for example, if the frontend LAN frame transmitted from the station is the simultaneous broadcast frame, then when the frontend LAN frame is divided into cells and transmitted from the port to the backbone LAN loop, the value of the destination node/port address is Ga and is received by the port 10A belonging to group A and forwarded to the frontend LAN 25 connected thereof, but is not received by the port 10A belonging to group B and therefore is not forwarded to the frontend LAN 25 under command thereof. This process applies to the frontend LAN frame when the destination station address is Not Found by filtering. Consequently, the traffic by the broadcast frame from the station and also caused by the FDB Not Found can be separated between groups, and this is favorable in the system management and operation. Although the two groups A, B are used in the above description, it is easily understood that more groups may be similarly used.

(2) As a specific application example of the above description, ports 10A with the frontend LANs of different MAC systems (for example, MAC system A and MAC system B) connected thereto are classified into the group A and the group B respectively, and the microprocessor 1013 of each port 10A is provided with means capable of deciding, the classification of the frontend LAN MAC system (for example, A system or B system) of the port. The microprocessor 1013 initializes the previously determined exclusive group address value (either Ga or Gb) in the transmission cell broadcast address register and the group address REG 10068, based on the decision results.

Thereby the frontend LANs in different MAC systems can use the same link of the backbone LAN 0, and moreover in the port 10A, merit is produced in that the receiving of the frontend LAN frames being different from each other in form due to the broadcast cell is eliminated and the error operation does not occur.

In another embodiment utilizing the S field of ACF, a port other than the port 10A, for example, the TDM circuit constitution is installed within the node 10, and the backbone LAN 0 as a whole is made a LAN for the multi media communication. In the TDM port, S of the ACF (synchronous cell) and B=1 are added to the transmission cell.

On the other hand, in the receive decision means of the switch means, a circuit for deciding the S field of the ACF is installed. When the port type is coincident (for example, S=00 for the port 10A, and S=10 for the TDM port), the port receiving the highway is notified of the cell receiving thereby initialization for the receive port can be easily realized. In the receive decision means 10032, a circuit of initializing the type of the port by the microprocessor 1000 is installed, and the type value of the above-mentioned receive port is initialized.

According to the present embodiment, following effects are obtained.

(1) The transparent routing can be done between the frontend LANs through the backbone LAN operated in SONET frame form.

(2) The transparent routing can be done between the frontend LANs through the backbone LAN constituted by a plurality of highways.

(3) The backbone LAN system as a whole, constituted by a plurality of highways for the communication in the SONET frame form and nodes connected thereto, can be realized in a bridge equivalent to the MAC bridge based on the IEEE 802.1d.

(4) The communication and the learning of the routing information can be performed between the frontend LANs connected to different highways.

(5) The other node (port) can perform learning and error checking based on the learning indication contained in the cell, including the address information. Even if there is no learning indication, the address learning information can exist on some specific cell (PSN=First on Single) thereby the PSN can be decided and other node/port addresses can be learned.

(6) A node connected to the backbone LAN constituted by a plurality of highways is provided with a plurality of ports. Each port has the bridge function. The node obtains the routing information commonly from all highways and distributes it to all ports, thereby each port can learn from any link, improving the filtering efficiency.

(7) Based on the indication of the all position PSN of the backbone LAN information and value of the sequence SEQ, the frontend LAN frame can be re-assembled from a series of the backbone LAN cells.

(8) Since PSN, SEQ and the error check field ICS of each cell are provided, assembling/error check of the frontend LAN frame can be performed at the receiving side even if the cell does not have the information field of the total length of the frontend LAN frame. If a sufficient buffer is installed at the transmission/receive side, the transfer of a long frame can be easily performed.

(9) The highway number and the port address are made the same, thereby the routing becomes simple.

(10) Since the port performs cell receiving from a specific highway, the routing at the transmission side and the transmission/receive processing becomes simple.

(11) The specific port is classified into groups, and further the same group is assigned to the same highway, thereby the group broadcast transmission becomes simple and the broadcast traffic can be dispersed.

(12) Since cell buffers are provided in three stages or more, the learning, the filtering and the forwarding can be executed in concurrence, and the filtering performance and the transfer throughput can be improved.

Another embodiment of the invention will now be described. Contrary to the preceding embodiment where the learning indication L in the ACF is provided and the learning cell is recognized by decision of the value of the learning indication, the learning indication is discarded and the value of PSN of the backbone MAC header is decided and thereby the learning cell is recognized. Since the three-set address information for the learning entirely exists within First cell or Single cell, no problem is produced. Further it is easily analogized that a circuit for deciding the value of the learning indication L can be realized with only replacing it by a circuit for performing the decision regarding the values of the PSN.

In the preceding embodiment, the learning information within the cell is the three-set address comprising the station address, the node address and the port address. In a further embodiment, the learning indication L of the PSN or the ACF of the backbone MAC header is installed according to the preceding embodiment, and the arbitrary learning information is held on a cell where the PSN or the L takes a specific value (for example, PSN=First cell or Single cell or L=1), thereby it is easily analogized that the arbitrary learning information can be extracted from the specific cell at the receiving side of the port 10A and at the extraction means corresponding to the learned cell multiplexer 10034, and can be learning or stored at the routing data base means corresponding to the FDB means 1016. In a manner similar to the preceding embodiment, in the cell including the specific cell, an error check field, such as an HCS and ICS capable of performing error check of the cell content by the cell alone, is provided.

In still another embodiment, the learning cell multiplexer 10034 and the L line are not provided. As described in the preceding embodiment, the port 10A also performs the learning in the downward direction. The error operation of the port 10A does not occur in this embodiment.

Another embodiment of the invention will now be described. In the case of broadcast transmission due to unknown destination, as described above, the transmission controller 1008 uses the destination node/port address 956 in FIG. 2B as a broadcast address. The switch means 1003 transmits the cells to all N highways. However, only one cell for the learning indication is among those to be transmitted to all N highways. In adopting the method of installing the common learning path as described above, all the highways are bundled and receive the learning cell and the entry is registered using this learning cell. This learning processing requires just on cell. The transmission processing, other than the above description, is similar to Case 1 described in 4.1.

Next, in Case 2, when the received frame is discarded only the First cell is used for the learning.

In the transmission controller 1008, the destination node address of the cell header is made a null address, and the switch means 1003 transmits the learning bit in adding it to the first cell (L of the ACF-1). However, since the destination does not exist in the learning cell, all nodes 10 connected to the backbone LAN 13 do not receive the learning cell except to use for learning.

In Case 1, that is, in forwarding, the learning cell is generated in manner similar to the preceding embodiment, and transmitted to the highway. In the learning process, the FDB 1016 performs the learning by using the learning cell from the common learning path in manner similar to the preceding embodiment.

In the present embodiment, the learning from the frame received from the frontend LAN is possible without registering the sending station to the entry. This is because of following reason utilizing the features of the backbone LAN of loop shape. That is, irrespective of a forward/discard of a frame, the learning cell is transmitted to the backbone LAN, and is always returned to the original node. Then the entry may be registered using the learning cell.

When the learning cell is not forwarded during the discard, the entry is registered when the learning cell is received from the frontend LAN, and upon receiving the learning cell when the destination node address and the self node address are coincident. The learning cell is not registered, when both are not coincident, the learning cell is registered.

According to the present embodiment, the following effects are obtained.

(1) In the case of the discard frame, all the nodes connected to the backbone LAN can learn the sending station position, thereby the broadcast transmission due to unknown destination is decreased and the traffic of the backbone LAN and the frontend LAN is reduced.

(2) In the case of the broadcast transmission, since the learning cell only is transmitted to one highway, the same entry is not registered many times.

(3) The learning cell transmission node, in manner similar to other node, can register the entry from the learning cell after rounding the loop, thereby it need not be registered from the frame received from the frontend LAN. Consequently, the registering processing is reduced and further the hardware is simplified.

Further in the embodiment, although the description is made using the example of when the learning is not performed when the node receives the frame from the frontend LAN, following method will do.

When the frame is received from the frontend LAN, the source station address is registered to the entry table. When the learning cell is received from the backbone LAN, the registering is not performed if the source node address is coincident with the self node address. In this constitution, registering the address a second time after the learning cell has rounded the backbone loop can be prevented.

A further embodiment of the invention will now be described referring to the accompanying drawings.

FIGS. 12A-12D are diagrams showing a schematic system constitution example to explain system of the embodiment; FIG. 13 is a diagram showing a frame structure of a frontend LAN, frame structure of a backbone LAN and structure of a learning frame for the routing learning. FIG. 14 is a diagram showing specific structure of a node connected to the backbone LAN 1 in FIG. 12.

In FIG. 12, numeral 1 designates a backbone LAN constituted by one highway of loop shape, numerals 2-4 designate nodes connected to the backbone LAN 1, numerals 21, 31, 41 designate entry tables held by the nodes, numerals 5-7 designate frontend LANs connected to the backbone LAN 1, and numerals 51, 52, 61, 71, 72 designate stations connected to the frontend LANs 5-7.

Figure 12A:
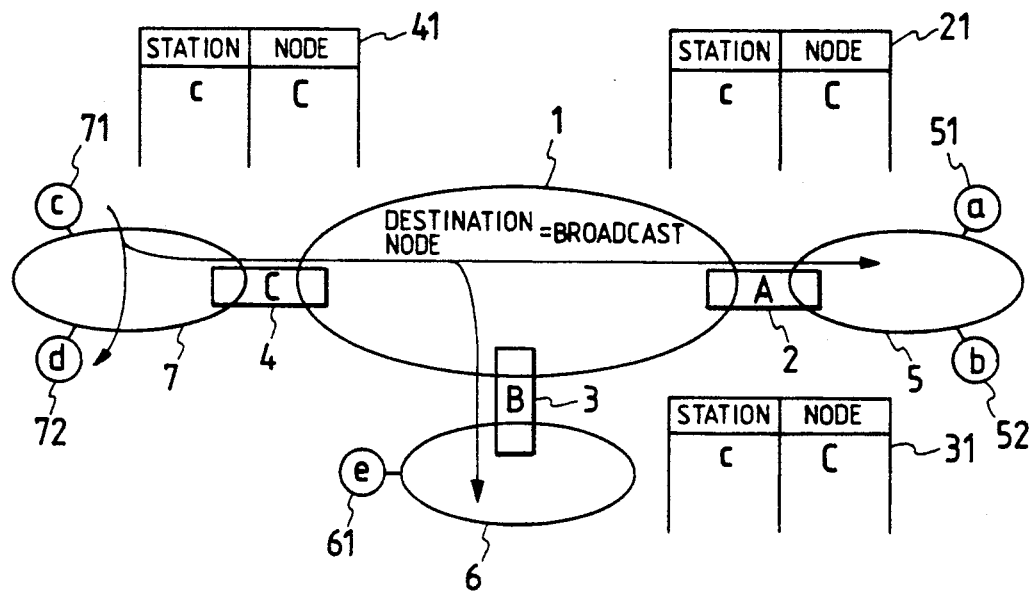
FIGS. 12A–12D are system model diagrams illustrating another embodiment of the invention.

In FIG. 12A, station 71, for example, is connected to the frontend LAN 7 and transmits a frame to station 72 also connected to the frontend LAN 7. In the embodiment, an example of when node=port will be described so as to simplify the description.

The frame, transmitted by the station 71, is received by the destination station 72 even if it is not forwarded by the node. The frame as shown in constitution of FIG. 13A, is a frontend LAN frame including a destination station address, a source station address and an information field. In this case, the destination station address is d, and the source station address is c.

The node 4 receives the frame from the frontend LAN 7. Node 4 uses the destination station address d as a key to retrive a node address incorporating the destination station (i.e., a node address connecting the frontend LAN connecting the destination station) from the entry table 41. However, since the address d is not yet registered to the entry table, the position of the destination station is not known. Consequently, node 4 transmits the received frame to all nodes connected to the backbone LAN. That is, a header having the destination node address equal to broadcast address and the source node address equal to self node address C is added to the received frame, and the frame, constructed as shown in FIG. 13C, is then transmitted to the backbone LAN 1. All other nodes 2-3 connected to the backbone LAN 1 receive this frame with the destination node equal to broadcast. The nodes remove the backbone LAN header and then forward the frame to the frontend LAN incorporated by each self node.

In this case, the learning of the routing information of each node is performed as follows.

The node 4, when forwarding from the frontend LAN 7 to the backbone LAN 1, registers the source station address c of the received frontend LAN frame and the self node address C to the entry table 41. On the other hand, all other nodes 2-3 connected to the backbone LAN 1 receive the frame from the backbone LAN 1, and register the source station address c included in the frame and the source node address C to the entry tables 21, 31 respectively.

Next, the case when the node does not forward the frontend LAN frame to the backbone LAN will be described.

Figure 12B:
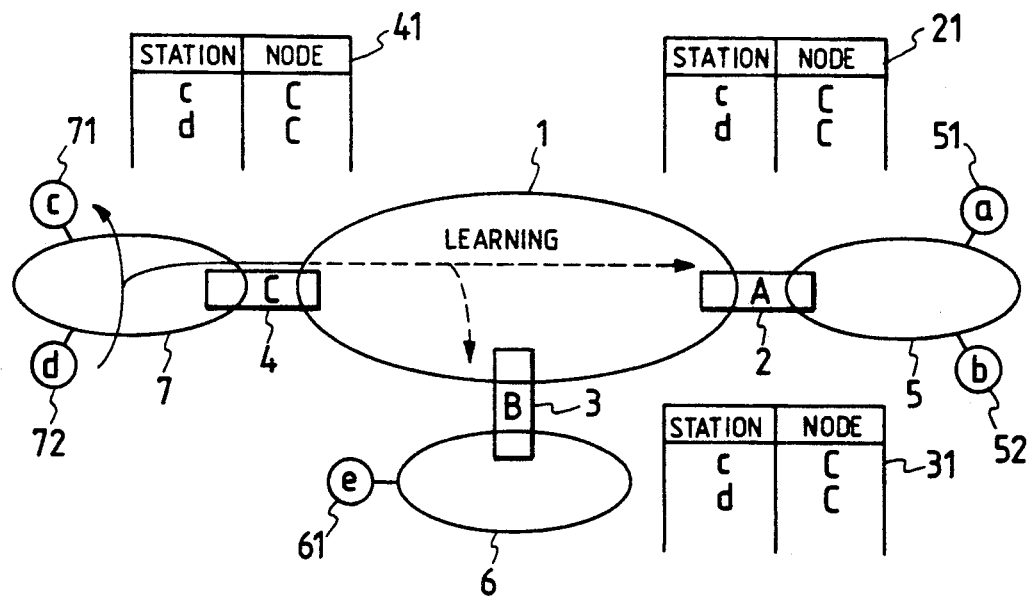

In FIG. 12B, for example, when the station 72 connected to the frontend LAN 7 performs transmission to the station 71 connected to the frontend LAN 7, the transmission/receive process between the stations is similar to the above description. Node 4 receives the frontend LAN frame from the fronted LAN 7, and if the destination station address c is used as a retrieval key and the entry in table 41 is retrieved, it is seen that the address c as previously learned in the above processing and this is a station incorporated by the self node. Consequently, the frame is discarded. In this case, in order to instruct all nodes that the node address incorporating station address d is C, the node 4 constructs the learning frame with only the routing information as shown in FIG. 13B, and transmits the learning frame to the backbone LAN 1 and registers it to the self entry table 41. The learning frame includes the backbone LAN header with the destination node address equaling the null address and the source address equaling the self node address (C), and the source station address (d). Consequently, nodes 2-3 can learn the source station address d and the node address C incorporating this from the backbone LAN 1 in a similar manner to the above description. However, since the learning frame has the destination node address equalling the null address and is not directed to the self node, nodes 2-3 discard the learning frame and do not transfer it to the frontend LAN.

Next, the communication extending between different frontend LANs will be described using FIGS. 12C and 12D.

Figure 12C:
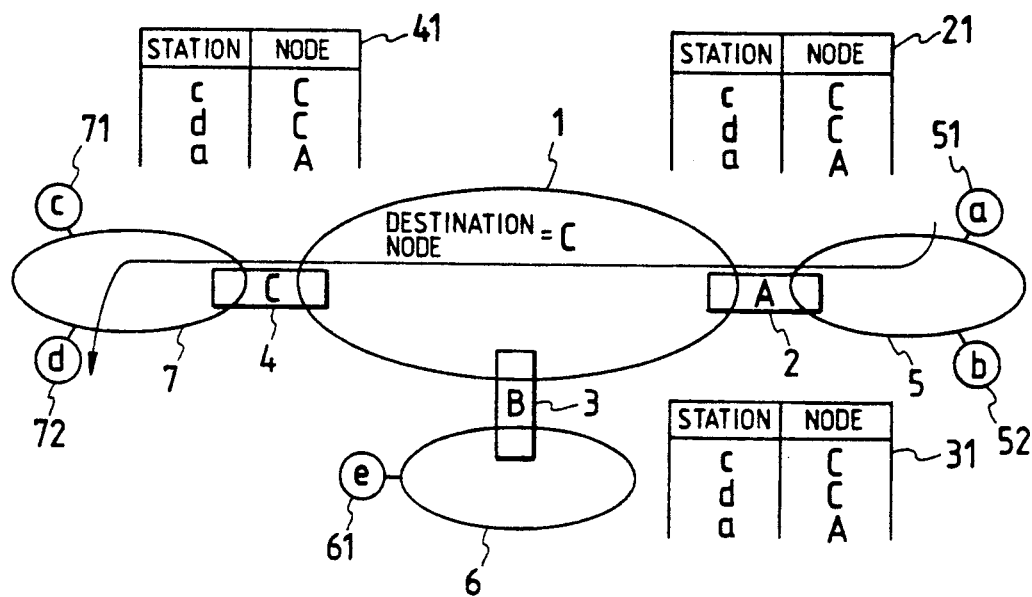

In FIG. 12C, the station 51 connected to the frontend LAN 5 transmits the frame with the destination station address d to the frontend LAN 5. Node 2 receives the frame and retrieves the destination station d from the entry table 21 so as to obtain the destination node address C. In this case, the station address d was previously learned from the learning frame during the discard. Consequently, the destination node address C and the source node address A are added to the received frame, thereby the backbone LAN frame is constructed and transmitted to the backbone LAN 1. Node 4, having the node address C, receives the frame and forwards it to the frontend LAN 7. The frame is received by the station 72 or the station address d. On the other hand, node 3, having the node address B, discards the frame because of non-coincidence of the destination node addresses, and does not forward it to the frontend LAN 6. Each node registers the station address a and the node address A to the entry table respectively.

The case when the source node performs the broadcast transmission due to unknown destination node (no entry) will be described as follows.

Figure 12D:
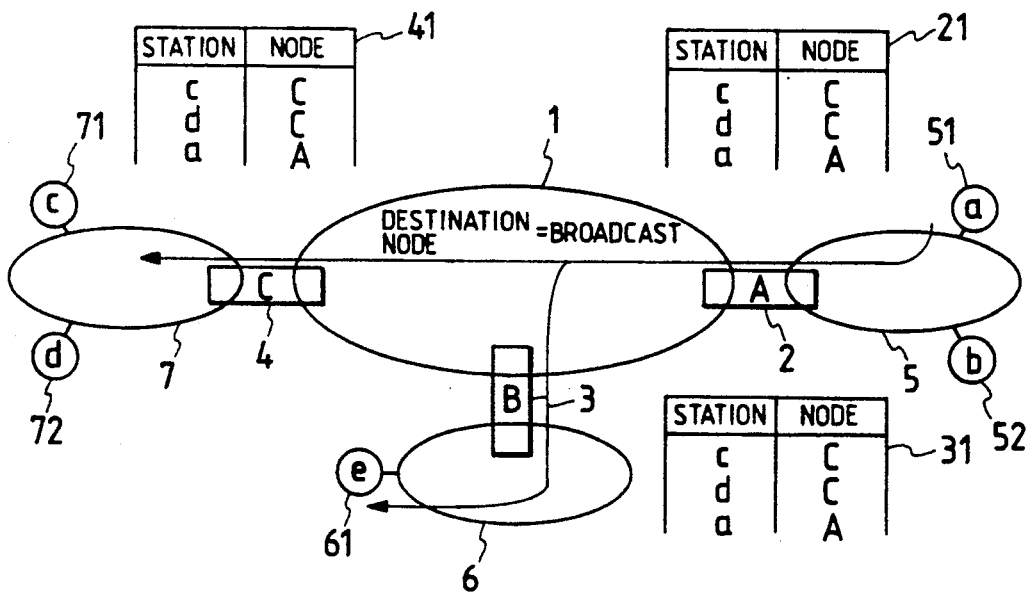

In FIG. 12D, connected to the frontend LAN 5, transmits the frame with the destination station address e. When node 2 receives this frame, the destination station address e is not yet learned and cannot be found in the entry table 21. Consequently, in this case, the frame is transmitted in broadcast mode to the backbone LAN 1. Nodes 3, 4 receive this frame, and forward it to the frontend LANs 6, 7 respectively. Consequently, only station 61 of frontend LAN 6 and receives the frame forwarded by node 3.

FIG. 14 shows the constitution of a specific example of each of the nodes 4-6 in the present embodiment. In FIG. 14, numeral 80 designates a node performing the data forwarding between the frontend LAN and the backbone LAN 1, numeral 81 designates a store/search means of routing information, numeral 82 designates an entry table, numeral 83 designates a frontend LAN controller, numeral 84 designates a transmission controller, numeral 85 designates a receive buffer for storing the data received from the frontend LAN, numeral 86 designates a transmission means for adding the backbone LAN header to the frontend LAN frame and for transmitting it to the backbone LAN, numeral 87 designates a receive means for taking the frame, numeral 88 designates a receive controller, and numeral 89 designates a transmission buffer for storing the frame to be transmitted to the frontend LAN.

The forwarding processing from the frontend LAN to the backbone LAN 1 in this constitution will be described.

The frontend LAN controller 83 takes all frames flowing through the frontend LANs into the receive buffer 85. The frontend LAN controller 83 asks the transmission controller 84 for transmission. The receive controller 84 commands the store/search means 81 to retrieve routing information. The store/research means 81 of routing information takes the destination address of the frontend LAN frame as shown in FIG. 13A from the receive buffer 85, and searches the entry table 82 shown in FIG. 12 and informs the transmission controller of the destination node address. The transmission controller 84 performs the forward/discard decision as described above. If it is forward, the transmission controller 84 transmits the destination node address to the transmission means 86, and takes the desired frame from the receive buffer 85 and transfers the frontend LAN frame to the transmission means 86. The transmission means 86 constructs the backbone LAN frame as shown in FIG. 13C, and transmits it to the backbone LAN 1. In the case of discard, the transmission controller 84 discards the frame within the receive buffer 85. The transmission means 86 transmits the learning frame as shown in FIG. 13B to the backbone LAN 1.

Next, the receiving processing in this constitution will be described.

If the frame received from the backbone LAN 1 is data directed to the self node, the receive means 87 stores the frontend LAN frame excluding the backbone LAN header of the received frame to the transmission buffer 89. The receive controller 88 controls this.

Also the learning processing in this node is as follows.

The receive means 87 transmits the source node address and the source station address from all received frames to the store/search means 81 of routing information, and the routing information store/search means 81 stores this in the entry table 82.

According to the present embodiment, described in detail by referring to FIGS. 12-14, the following effects are obtained.

Even in the case of discard, all nodes connected to the backbone LAN 1 can learn the source station position, thereby the broadcast transmission due to unknown destination is decreased and the traffic of the backbone LAN and the frontend LAN is reduced.

Each node is in the backbone LAN direction only and the retrieval of only the destination station address is sufficient, thereby the retrieval in the frontend LAN direction becomes unnecessary and the load of the retrieval processing is reduced.

The embodiment uses the entry comprising the station and the node address incorporating this, and its object is to eliminate the entry retrieval in the frontend LAN direction.

That is, since the transmission node forwarding information to the backbone LAN adds the destination node address, the receive node may only decide the coincidence of the destination node address with the self node address.

Consequently, if the node, receiving information from the backbone LAN, retrieves the entry in the frontend LAN direction and performs the forward/discard decision, the entry is sufficient information to determine whether the station position is at the frontend LAN side or at the backbone LAN side. Also in this system, the system of noticing the station position in other nodes upon receiving the discard frame can be applied, and the broadcast transmission due to unknown destination is decreased.

In the above embodiment, when the node receives data from the frontend LAN, even in the case of discard, the source station position is always transmitted to the backbone LAN, and this can be realized also in following embodiment.

Figure 15A:
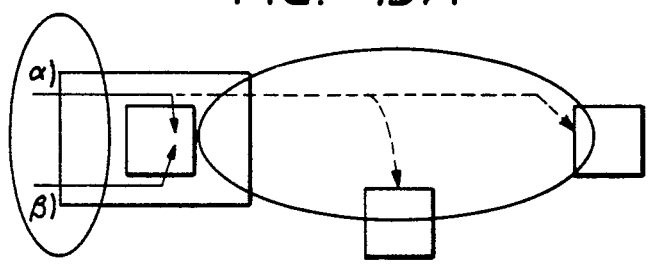
FIGS. 15A to 15D are system constitution diagrams illustrating a further embodiment of the invention.

That is, as shown in FIG. 15A, when the node receives data from the frontend LAN, the source station position is registered to the entry table. If the station is registered for the first time, the source station position is transmitted to the backbone LAN so as to inform all other nodes (a) of the source station's location. If the position has been already registered, the other nodes must know it and therefore the notice is not necessary in this case. Consequently, the source station position is not transmitted to the backbone LAN ($\beta$).

Thereby the learning processing can be further reduced.

In this method, however, data transmitted by the self node goes around a loop and is returned to the original position. If the learning processing is executed in this state, the same learning is performed two times resulting in futileness. This can be avoided in following embodiment.

Figure 15B:
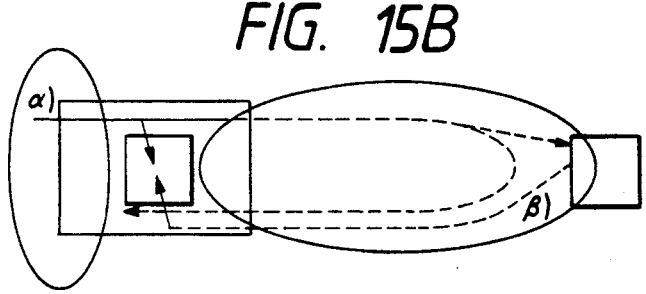

That is, as shown in FIG. 15B, if the data received from the backbone LAN is that transmitted by the self node, the learning processing is not executed ($\alpha$). More specifically, if the source node address of the header of the received data is coincident with the self node address, the registering processing is inhibited thereby the object can be realized. If the received data is that transmitted by another node, of course, this is registered ($\beta$).

Thereby the redundant learning process can be prevented.

If the data received from the frontend LAN is to be discarded, in the situation when the source station position is not transmitted to the backbone LAN, when the data is received from the frontend LAN, it always must be learned.

An embodiment of the learning method in this system will be described as follows.

Figure 15C:
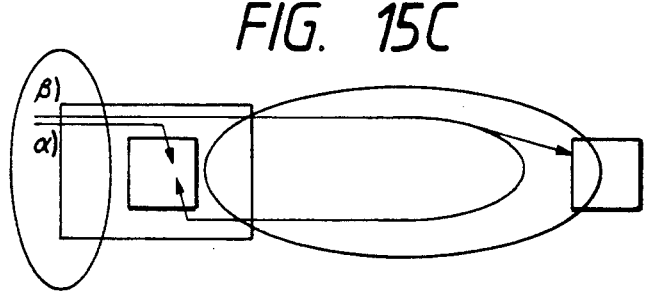

FIG. 15C, (a) shows the case of discarding, and FIG. 15C, ($\beta$) shows the case of forwarding.

In (a) of FIG. 15(a), if data received from the frontend LAN is to be discarded, the source station position is registered to the entry table. Then the source station position is not transmitted to the backbone LAN.

On the other hand, in ($\beta$) of FIG. 15C, if data received from the frontend LAN is to be forwarded, the source station position is not registered to the entry table, but the received data is transmitted to the backbone LAN. The data is returned after rounding the backbone loop at which point the source station position is registered to the entry table.

Thereby the learning processing is performed one time irrespective of discard/forward. Also the decision processing for the learning inhibiting due to data rounding the backbone loop is not necessary.

Next, an embodiment in method of representing the station position only by whether it is at the frontend LAN side or at the backbone LAN side will be described as follows.

Figure 15D:
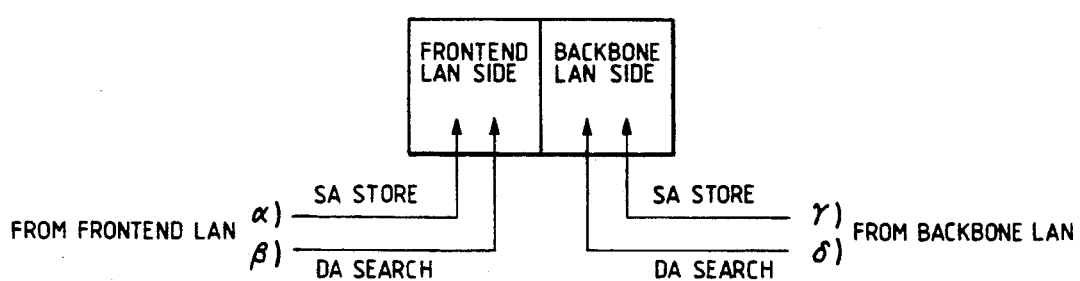

In this embodiment, as shown in FIG. 15D, the entry table is divided to store station addresses at the frontend LAN side and station addresses at the backbone LAN side. That is, the station registered in the entry table for the frontend LAN side is positioned at the frontend LAN side, and the station registered in the entry table for the backbone LAN side is positioned at the backbone LAN side. The store/search method is as follows.

$\alpha$) Store processing in the case when data is received from the frontend LAN . . . The source station address (SA) is registered to the entry table for the frontend LAN side.

$\beta$) Decision processing of forward/discard in the case when data is received from the frontend LAN . . . The entry table for the frontend LAN side is searched for the destination station address (DA) and if found, it is discarded. If not found, it is either not at the frontend LAN side or not yet registered. Consequently, it is forwarded.

$\gamma$) Store processing in the case when data is received from the backbone LAN . . . The source station address (SA) is registered to the entry table for the backbone LAN side.

$\delta$) Decision processing of forward/discard in the case when data is received from the backbone LAN . . . The entry table for the backbone LAN side is searched for the destination station address (DA) table for the backbone LAN side, and if found, it is discarded. If not found, it is forwarded.

Thereby the decision processing of forward/discard can be realized without using the node address. Also the header is not required for the routing, and the routing between the frontend LAN— frontend LAN can be realized.

The above embodiment has been described regarding the routing between frontend LAN— backbone LAN— frontend LAN. Further, the invention can be also applied, of course, to the forwarding device connecting between frontend LAN— frontend LAN.

According to the present invention, as described above in detail, the following effects are obtained.

(1) The transparent routing between the frontend LANs can be done through a network for communication in fixed length data unit.

(2) The transparent routing between the frontend LANs can be done through a network composed of a plurality of links.

(3) Since the node connected to the network for communication in fixed length data unit includes the learning command to the fixed length data, including the routing information, the other node can perform learning based on this.

(4) In the forwarding device connecting between the network for transfer in fixed length data unit and the network for transfer in variable length data unit, the filtering/learning is performed, and at the same time the conversion of data transfer form and the transfer can be done.

(5) Node connected to the network composed of a plurality of links is provided with a plurality of ports, and the node obtains the routing information commonly from all links and distributes it to all ports, thereby each port can learn from any link and the filtering efficiency can be improved.

We claim:

1. A communication system for inter-connecting a plurality of frontend networks with a loop-type backbone network, the communication system comprising:
   the backbone network including a plurality of logical or physical highways;
   at least one node means connected to the backbone network, said node means including a bridge means connected to a corresponding one of the frontend networks, said bridge means including
      a segmenting means for segmenting a first data block of variable length received from the frontend network, into at least one of second data blocks of preselected, fixed length to be sent along the backbone network,
      a searching means for searching a routing information table with a destination station address contained in said first data block,
      a registering means for registering routing information including a source station address of said first data block in said routing information table, and
      an assembling means for reassembling said first data block from at least one of said second data blocks received from the backbone network; and
   a switching means for selectively connecting said bridge means to at least one of said backbone network highways to transmit said second data blocks along the backbone network.

2. The communication system according to claim 1, wherein said switching means connects said bridge means to all of said backbone network highways in order to broadcast forward said second data blocks in accordance with results of said searching means searching the routing information table.

3. The communication system according to claim 1, wherein each of said second data blocks has a learning indicator field and an error check field.

4. The communication system according to claim 1, wherein said node means includes a plurality of said bridge means.

5. The communication system according to claim 4, wherein said switching means connects each of said bridge means to a predetermined one of said highways in order to receive said second data block from the backbone network.

6. The communication system according to claim 1, wherein said bridge means directly transmits at least one of said first data blocks reassembled by said assembling means to the frontend network connected to said bridge means when a transmission becomes ready.

7. The communication system according to claim 1, wherein
   said assembling means includes a receive controller and a re-assemble buffer means, said re-assemble buffer means having a re-assemble management table and a set of fixed length buffers with a chain pointer, and
   said receive controller includes means for storing said second data blocks consecutively received from said bridge means, and means for executing assembling said second data blocks transmitted from the bridge means to said first data block by using said chain pointer of said fixed length buffers and said re-assemble management table.

8. The communication system according to claim 1, wherein each of said second block has a backbone MAC header including at least a cell position field and a sequence number field, and said assembling means includes a receive controller for executing an error check of said cell position field and sequence number field.

9. The communication system according to claim 1, wherein said assembling means includes a receive controller having a group address register means for storing group address and a receive decision means for deciding to selectively receive one of said broadcasted second data blocks from said backbone network in accordance with said group address and destination address included in one of said broadcasted second data blocks so as to limit a number of said bridge means which can receive one of said broadcasted second data blocks.

10. A communication system for transferring data between a plurality of frontend networks with a loop-type backbone network, each of the frontend networks being connected with at least one station, the communication system comprising:
   the backbone network including a plurality of physical or logical highways;
   a plurality of nodes connected to the backbone network; and,
   each of the plurality of nodes including bridge means corresponding to frontend networks and a switching means for selectively connecting said bridge means to said highways, said bridge means including:
      a first converting means for converting a first data block of variable length received from a corresponding frontend network into at least one second data block of fixed length, said first data block having a destination station address and a source station address, each second data block having error check information and learning indicator information to be transferred to the backbone network, a second converting means for converting at least one of said second data blocks received from the backbone network into said first data block, and a searching and registering means for searching a routing information table with said destination station address to determine at least one of said highways to be connected by said switching means on which to transmit said second data block and for registering routing information including said source station address in said routing information table.

11. The communication system according to claim 10, wherein said second data block is transferred from the backbone network with said error check information and said learning indicator information thereof, and said searching and registering means executes a learning routine in response to said learning indicator information and an output of an error checking means.

12. The communication system according to claim 10, wherein each of said second data blocks has an AFC field including at least a learning indicator field, said learning indicator field being used as said learning indicator information.

13. The communication system according to claim 10, wherein each of said second data blocks has a backbone MAC header including at least a cell position field, said cell position field being used as said learning indicator information.

14. A method for transferring data between a plurality of frontend networks, each of the frontend networks connecting at least one station through bridge circuits to a backbone network, the backbone network including a plurality of physical or logical loop highways, the method comprising the steps of:

receiving a first data block of variable length having a destination and source station address from one of the frontend networks;

segmenting the first data block into at least one of fixed length second data blocks each including a control field having a learning indicator field, a content field, and an error check code field;

determining on which highway to transmit each second data block by searching a routing information table with said destination station address;

transmitting each second data block on the determined highway; and registering routing information including said source station address of the corresponding segmented first data block in said routing information table.

15. The data transferring method according to claim 14, further comprising steps of:

checking said error check code field of said second data block transmitted from the backbone network.

16. The data transferring method according to claim 15, further comprising steps of:

learning said routing information derived from said second data block in accordance with said learning indicator field thereof and a result of said checking step.

17. In a communication system in which a plurality of frontend LANs which connect a plurality of stations are connected through a plurality of physical or logical loop highways, a node comprising:

a loop access control means for selecting the logical highways on which to transmit a plurality of fixed length backbone LAN cells to another node; and a bridge means connected between said loop access control means and corresponding frontend LANs, said bridge means including a converting means for converting each variable length frontend LAN frame received from one of the frontend LANs into at least one of said backbone LAN cells, each of said backbone LAN cells having a learning indicator field and an error code check field.

18. The node according to claim 17, wherein said learning indicator field has information denoting whether said cell is a first, single one of said backbone LAN cells.

19. The node according to claim 18, further comprising:

a storing/searching means for storing routing information including a set of a station address and a node address, said storing/searching means storing said routing information in response to said learning indicator field when said node receives said backbone LAN cells from the physical or logical loop highways.

20. The node according to claim 13, wherein a plurality of said bridge means are connected to said loop access control means, and said routing information further includes a corresponding bridge address.

21. A communication system for communicating among a plurality of stations on a plurality of frontend LANs via a loop-type backbone LAN, the communication system comprising:

the backbone LAN including a plurality of physical or logical highways;

a bridge means connected to each of the frontend LANs, said bridge means including:

a segmenting means for segmenting a variable length first block from the frontend LAN to at least one of second data blocks, each of said second data blocks having a fixed length, and a searching means for searching a routing information table with a destination table; and a switching means for selectively connecting said bridge means to at least one of said logical highways to transfer said second data block to another one of the bridge means.

22. The communication system according to claim 21, wherein said bridge means further includes a re-assembling means for re-assembling said second data blocks received from the backbone LAN into said first data block.

23. A communication system for communicating among a plurality of stations on a plurality of frontend LANs via a backbone LAN, the communication system comprising:

a backbone LAN including a plurality of physical or logical highways;

a bridge means connected to each of the frontend LANs, said bridge means including:

a segmented means for segmenting a variable length first data block from the frontend LAN to at least one of second data blocks, each of said second data blocks having a fixed length, and a searching means for searching a routing information table with a destination station address contained in said first data block; and switching means for connecting said bridge means to all of said physical or logical highways to transfer said second data blocks by broadcast in accordance with a searching result of said searching means.

24. In a communication system between a plurality of stations connected to a plurality of frontend networks, each of the frontend networks being connected to one of a plurality nodes of a backbone network that includes a plurality of logical or physical loop highways, the one node having a routing information table, a method of learning routing information in the node comprising the steps of:

segmenting a frontend network frame received from the frontend network into at least one backbone network cell to be transmitted to the backbone network;

searching the routing information table to retrieve a search result corresponding to a destination station address contained in said frontend network frame; and selecting one or all of the highways in response to the result of said searching step on which to transmit said backbone network cell to the backbone network.

25. In a communication system between a plurality of stations connected to a plurality of frontend networks, each of the frontend networks being connected to one of a plurality of nodes of a backbone network that includes a plurality of logical or physical loop highways, in which each node has a table for storing routing information, a means to convert first data block received from the frontend network to at least one second data block, and a means to transmit each second data block to a designated one of the nodes, a method of learning the routing information in the node comprising the steps of:

searching the table with a destination station address contained in each first data block received from the frontend network;

adding learning indicator information to each second data block, which learning indicator information includes station position information;

transmitting each second data block with said added learning indicator information to a corresponding one of the highways;

receiving each second data block with said added learning indicator information from all of the highways; and registering said station position information from the learning indicator information of each received second data block into the table.

26. A communication system for interconnecting a plurality of frontend networks with a loop-type backbone network, the communication system comprising:

the backbone network including a plurality of logical or physical highways;

at least one node means connected to the backbone network, said node means including a bridge means connected to a corresponding one of the frontend networks, said bridge means includes a segment means for segmenting a first data block of variable length received from the frontend network, into second data blocks of fixed length to be transmitted along the backbone network, each of said second data blocks having a destination address field, a source address field, a backbone MAC header field, and a cell content field, a searching means for searching a routing information table with a destination station address contained in said first data blocks, and an assembling means for re-assembling said first data block from at least one of said second data blocks received from the backbone network, said assembling means including a receive control means and a reassemble buffer means for buffering reassembled said first data block, and said receive control means having means for storing a group broadcast information and means for selectively receiving broadcasted second data blocks in accordance with said destination field and said group broadcast information; and, a switching means for selectively connecting said bridge means to at least one of said backbone network highways to transmit said second data block along the backbone network.

* * * * *